United States Patent
Gerwe et al.

(10) Patent No.: US 9,908,640 B2
(45) Date of Patent: Mar. 6, 2018

(54) INCLINED SUPER-GEO ORBIT FOR IMPROVED SPACE-SURVEILLANCE

(71) Applicant: THE BOEING COMPANY, Chicago, IL (US)

(72) Inventors: David R. Gerwe, Chicago, IL (US); Keith R. Williams, Chicago, IL (US); John Lambert, Chicago, IL (US); Paul D. Tarbuck, Chicago, IL (US); Edward A. Estrada, Chicago, IL (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 14/841,572

(22) Filed: Aug. 31, 2015

(65) Prior Publication Data

US 2017/0057661 A1  Mar. 2, 2017

(51) Int. Cl.
| | | |
|---|---|---|
| B64D 47/08 | (2006.01) |
| G06K 9/62 | (2006.01) |
| B64G 1/10 | (2006.01) |
| B64G 1/24 | (2006.01) |
| G06K 9/46 | (2006.01) |
| G06K 9/52 | (2006.01) |
| G06T 7/60 | (2017.01) |

(52) U.S. Cl.
CPC ........... B64D 47/08 (2013.01); B64G 1/1021 (2013.01); B64G 1/242 (2013.01); G06K 9/4661 (2013.01); G06K 9/52 (2013.01); G06K 9/6201 (2013.01); G06T 7/60 (2013.01); *B64G 2001/1028* (2013.01); *B64G 2001/1035* (2013.01)

(58) Field of Classification Search
CPC . B64D 47/08; G06T 7/60; G06K 9/52; G06K 9/6201; G06K 9/4661; B64G 1/242; B64G 1/1021; B64G 2001/1028; B64G 2001/1035

See application file for complete search history.

(56) References Cited

U.S. PATENT DOCUMENTS

| | | | |
|---|---|---|---|
| 3,135,591 A * | 6/1964 | Jones | B01D 53/22 427/244 |
| 6,271,877 B1 * | 8/2001 | LeCompte | G01C 11/025 348/144 |
| 6,493,021 B1 | 12/2002 | Rouge et al. | |

(Continued)

OTHER PUBLICATIONS

The extended European search report dated Jan. 19, 2017 in European Patent Application No. 16178214.9-1754 (6pages).

*Primary Examiner* — Sath V Perungavoor
*Assistant Examiner* — Howard D Brown, Jr.
(74) *Attorney, Agent, or Firm* — Haynes and Boone, LLP

(57) ABSTRACT

Systems, methods, and apparatus for space surveillance are disclosed herein. In one or more embodiments, the disclosed method involves scanning, by at least one sensor on at least one satellite in inclined super-geostationary earth orbit (super-GEO), a raster scan over a field of regard (FOR). In one or more embodiments, the scanning is at a variable rate, which is dependent upon a target dwell time for detecting a target of interest. In at least one embodiment, the target dwell time is a function of a range from at least one sensor to the target of interest and a function of a solar phase angle. In some embodiments, the axis of inclination of the inclined super-GEO is a function of the solar phase angle.

19 Claims, 18 Drawing Sheets

(56) References Cited

U.S. PATENT DOCUMENTS

| | | | |
|---|---|---|---|
| 2002/0041328 A1* | 4/2002 | LeCompte | G01C 11/025 348/144 |
| 2008/0081556 A1* | 4/2008 | Robinson | H04B 7/18519 455/12.1 |
| 2011/0049302 A1* | 3/2011 | Vance | B64G 1/1021 244/158.4 |
| 2011/0226907 A1* | 9/2011 | Robinson | B64G 1/1085 244/158.4 |
| 2017/0057662 A1 | 3/2017 | Gerwe et al. | |

* cited by examiner

Background Terminology $P_C$ — Probability of "collecting" a target based on M-of-N detections along full N-frame streak
$$P_C = \sum_{k=M}^{N} \binom{N}{k}(P_D)^k(1-P_D)^{N-k}$$

$P_D$ — Probability of detecting a target within a single frame (using multiple pixels along the streak segment within the frame)

$P_Z$ — Probability of declaring a detection hit at a single pixel using trimmed mean & stdev of a N-frame Z-stack $\Delta t$ — Single frame exposure time $N$ — Number fo frames in a collect $L$ — Length of streak for one exposure time $L = R^* \tau$, R=target motion rate in pix/sec $T$ — Target tot. FPA signal (e-/sec)

$B$ — Background signal flux (e-/sec/pix)

$\sigma_D$ — Detector noise $B_{E,x\%}(L)$ — Fraction of energy within highest brightness pixel for streak length L associated with x% percentile for random distribution of all possible streak geometries relative to pixels. x='M' implies mean of distribution TNR — Threshold-to-Noise-Ratio for Z-stack detection $1500 \;\; TNR = SNR_{Targ\,Pix} = \dfrac{B_{E,80\%}(L)T\Delta t}{\sqrt{B_{E,80\%}(L)T\Delta t + B\Delta t + \sigma_D^2}}$ $1510 \;\; d = \underbrace{B_{E,80\%}(L)T\Delta t}_{\substack{\text{pixel} \\ \text{electron count}}} + \underbrace{B\Delta t}_{\substack{\text{mean background} \\ \text{(BG) electrons}}} + \underbrace{n_B}_{\substack{\text{shot noise from} \\ \text{BG+detector noise}}} + \underbrace{n_S}_{\substack{\text{shot noise from} \\ \text{target signal}}}$ $\sigma_B^2 = B\Delta t + \sigma_D^2 \qquad \sigma_S^2 = \tau B_{E,80\%}(L)T\Delta t$ $1520 \;\; P_Z = Prob\{(\hat{d}-\hat{b}) > (TNR\sigma_B)\} = \dfrac{1}{2} erfc\left(\dfrac{TNR\sigma_B - S}{\sqrt{2(S+\sigma_B^2)}}\right)$

FIG. 15

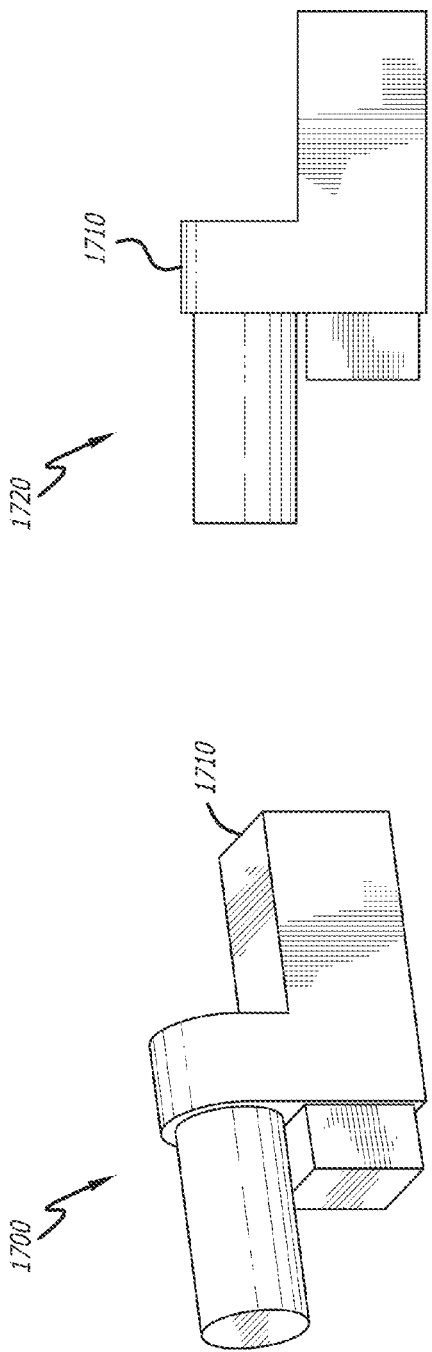

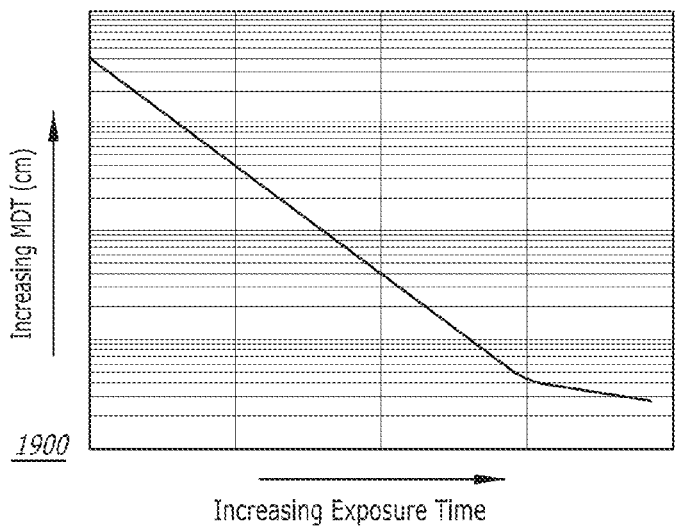
FIG. 19A
FIG. 19B
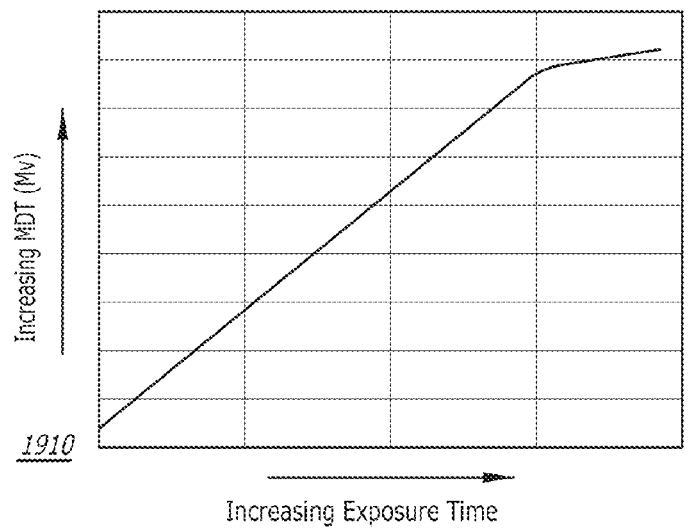
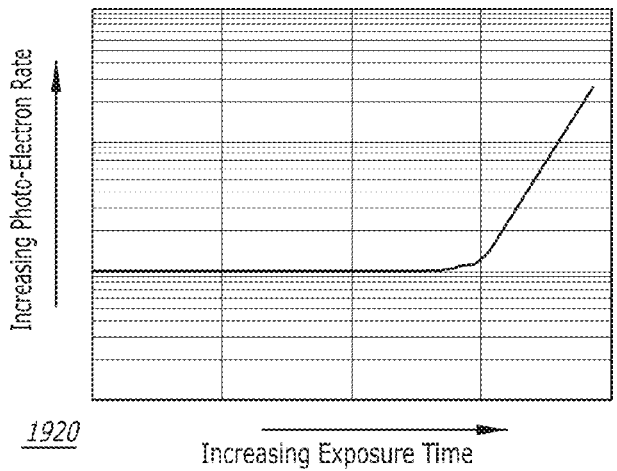
FIG. 19C

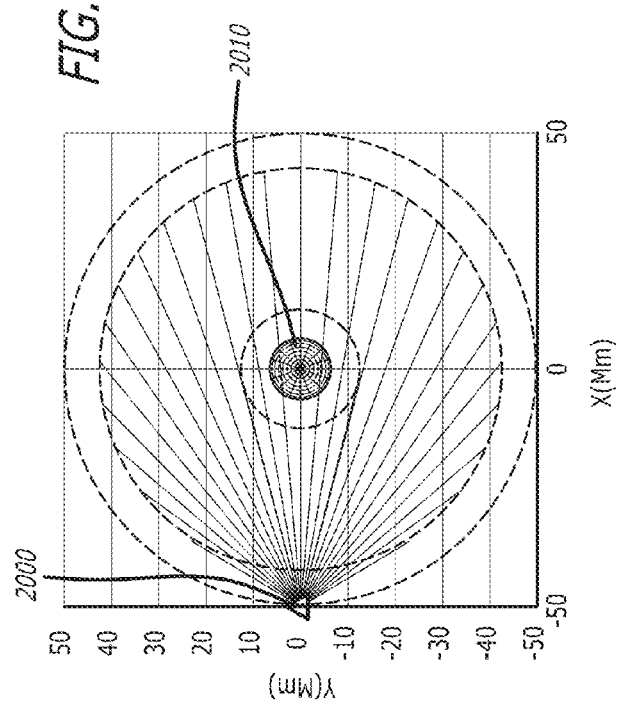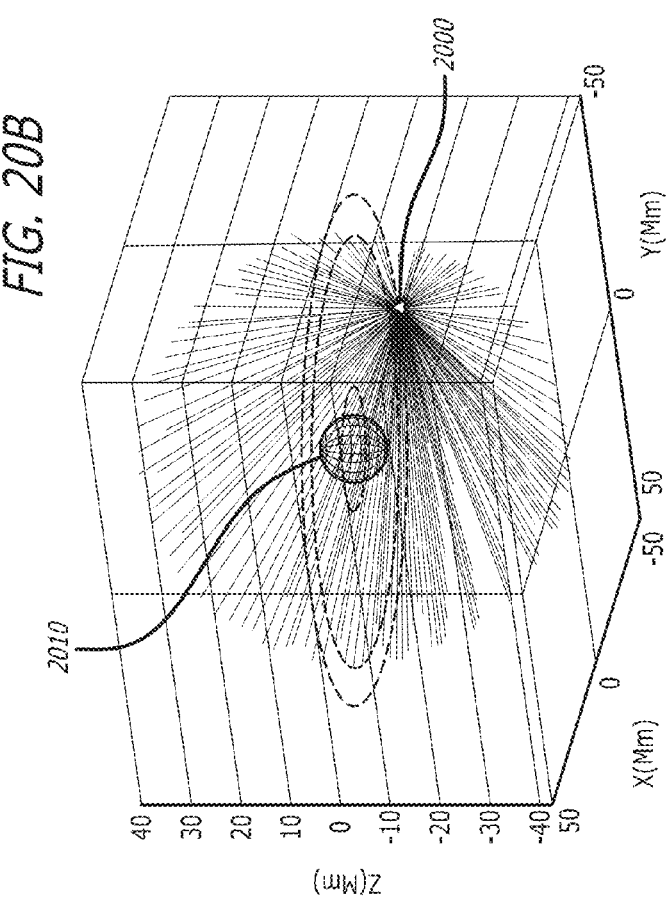

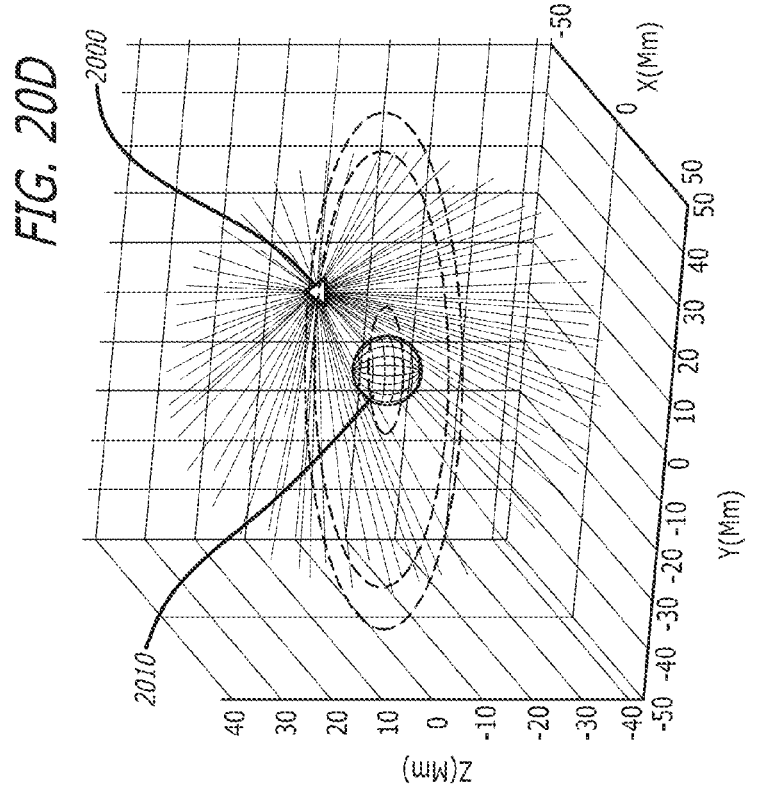
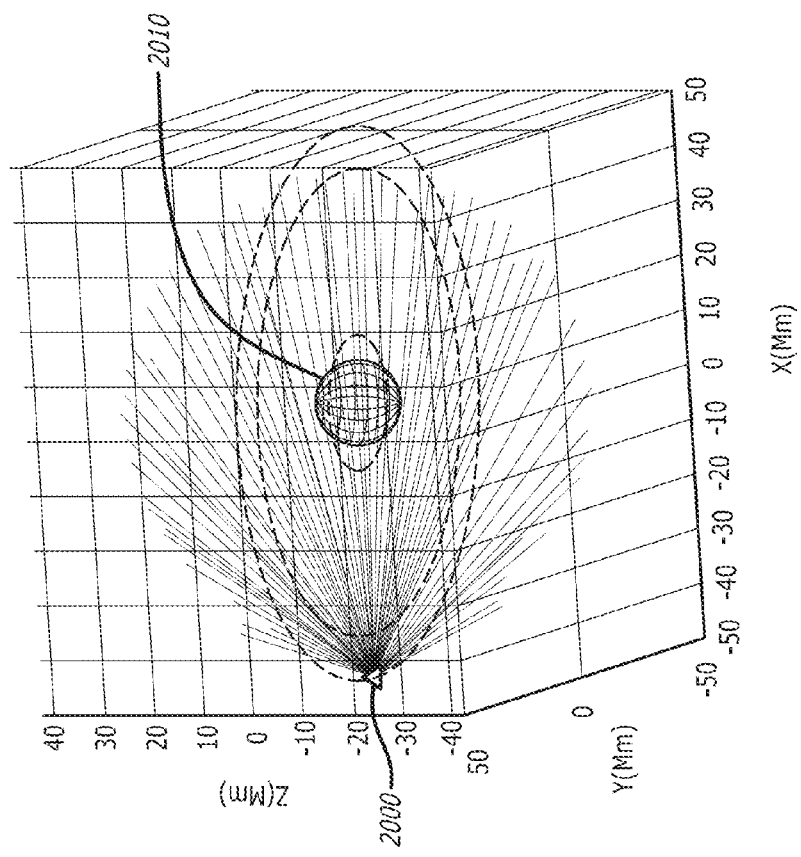

INCLINED SUPER-GEO ORBIT FOR IMPROVED SPACE-SURVEILLANCE

FIELD

The present disclosure relates to space surveillance. In particular, it relates to inclined super-GEO orbit for improved space-surveillance.

BACKGROUND

Currently, step-stare approaches are typically employed by sensors for space surveillance. Step-stare approaches capture a series of fields-of-views (FOVs) with small overlaps to surveill a larger field-of-regard (FOR). Reorienting the sensor to point to the next FOV position and allowing disturbances to settle after the reorienting requires additional time. However, methods that continuously scan across the field-of-regard at constant slew rates can minimize this additional time required. The use of a constant slew rate may result in better than required performance in many parts of the field-of-regard, but may also result insufficient performance in other parts and, thus, a constant slew rate can result in a far from optimal use of time. As such, there is a need for an improved technique for sensors for space surveillance.

SUMMARY

The present disclosure relates to a method, system, and apparatus for inclined super-GEO orbit for improved space-surveillance. In one or more embodiments, a method for space surveillance involves scanning, by at least one sensor on at least one satellite in super-geostationary earth orbit (super-GEO), a raster scan over a field of regard (FOR). In one or more embodiments, the scanning is at a variable rate, which is dependent upon a target dwell time for detecting a target of interest. In at least one embodiment, the target dwell time is a function of the characteristic brightness of the target.

In at least one embodiment, the target dwell time is further a function of the range from at least one sensor to the target of interest and a function of the solar phase angle.

In one or more embodiments, the raster scan comprises at least one sweep. In at least one embodiment, the at least one sweep is a continuous sweep.

In at least one embodiment, the field of regard (FOR) of at least one sensor is a function of a geometry between the sun and at least one satellite, and a function of an angle that at least one satellite is pointing.

In one or more embodiments, the method further comprises, during the scanning, collecting, by at least one sensor, image frames over time. In at least one embodiment, the image frames overlap.

In at least one embodiment, super-GEO is an orbit that has a radius that is larger than the geostationary earth orbit (GEO) radius for a majority of the duration of an orbital cycle.

In one or more embodiments, a time required for the raster scan is dependent upon the aperture diameter of at least one sensor and the target dwell time.

In at least one embodiment, the time required for the raster scan is further dependent upon the altitude of at least one sensor.

In one or more embodiments, the time required for the raster scan is further dependent upon the instantaneous field of view (IFOV) of at least one sensor.

In at least one embodiment, the method further involves comparing a detected brightness level in at least one of the image frames to a detection threshold. In one or more embodiments, the method further involves determining that the target of interest is present when the detected brightness level in at least one of the image frames exceeds the detection threshold. In some embodiments, the method further involves determining that the target of interest is not present when the detected brightness level in at least one of the image frames does not exceed the detection threshold.

In at least one embodiment, wherein when there is two or more satellites, the method further involves at least one of the satellites scanning at least a portion of the desired scan area where at least one of the sensors of at least one of the other satellites has low performance.

In one or more embodiments, a system for space surveillance involves at least one satellite in super-geostationary earth orbit (super-GEO). The system further involves at least one sensor, on the at least one satellite, to scan a raster scan over a field of regard (FOR). In one or more embodiments, the scanning is at a variable rate, which is dependent upon a target dwell time for detecting a target of interest. In at least one embodiment, the target dwell time is a function of a characteristic brightness of the target, which will vary throughout the FOR in relation to viewing geometry factors including distance to the targets, viewing geometry, and solar illumination angles.

In at least one embodiment, during the scanning, at least one sensor is further to collect image frames over time.

In one or more embodiments, at least one sensor is further to compare a detected brightness level in at least one of the image frames to a detection threshold. In at least one embodiment, at least one sensor is further to determine that the target of interest is present when the detected brightness level in at least one of the image frames exceeds the detection threshold. In some embodiments, at least one sensor is further to determine that the target of interest is not present when the detected brightness level in at least one of the image frames does not exceed the detection threshold.

In at least one embodiment, a method for space surveillance involves scanning, by at least one sensor on at least one satellite in inclined super-geostationary earth orbit (super-GEO), a raster scan over a field of regard (FOR). In one or more embodiments, the scanning is at a variable rate, which is dependent upon a target dwell time for detecting a target of interest. In at least one embodiment, the target dwell time is a function of a characteristic brightness of the target.

In one or more embodiments, the axis of inclination of the inclined super-GEO is chosen to minimize performance degradations due to earth exclusions.

In at least one embodiment, a system for space surveillance involves at least one satellite in inclined super-geostationary earth orbit (super-GEO). The system further involves at least one sensor, on the at least one satellite, to scan a raster scan over a field of regard (FOR). In one or more embodiments, the scanning is at a variable rate, which is dependent upon a target dwell time for detecting a target of interest. In at least one embodiment, the target dwell time is a function of a characteristic brightness of the target, which will vary throughout the FOR in relation to viewing geometry factors including distance to the targets, viewing geometry, and solar illumination angles.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 15 shows example formulas for a MDT model that may be employed by the disclosed system for space surveillance, in accordance with at least one embodiment of the present disclosure.

FIG. 16 shows exemplary formulas for a multi-pixel streak MDT model that may be employed by the disclosed system for space surveillance, in accordance with at least one embodiment of the present disclosure.

FIG. 17A shows a diagram of an exemplary sensor that may be employed for the disclosed system of space surveillance, in accordance with at least one embodiment of the present disclosure.

FIG. 17B shows a side view of the exemplary sensor of FIG. 17A, in accordance with at least one embodiment of the present disclosure.

FIG. 19A is a graph of the MDT size as a function of exposure time for the disclosed system for space surveillance, in accordance with at least one embodiment of the present disclosure.

FIG. 19B is a graph of the MDT absolute magnitude as a function of exposure time for the disclosed system for space surveillance, in accordance with at least one embodiment of the present disclosure.

FIG. 19C is a graph of scaled noise as a function of exposure time for the disclosed system for space surveillance, in accordance with at least one embodiment of the present disclosure.

Figure 1A:
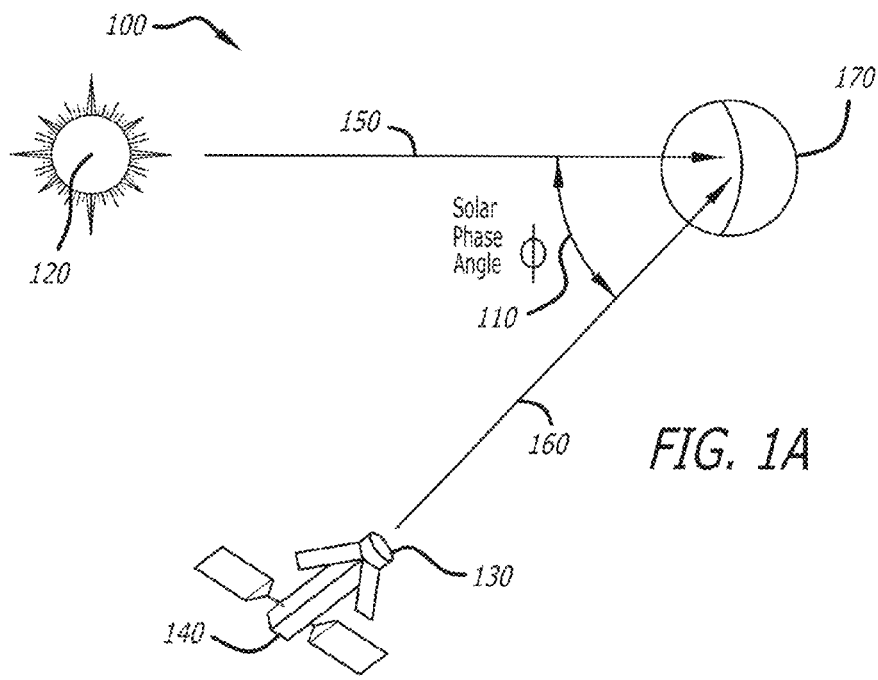
FIG. 1A is a diagram depicting the solar phase angle between the sun and a sensor on a satellite that may be employed for the disclosed system for space surveillance, in accordance with at least one embodiment of the present disclosure.

FIGS. 20A-D are graphs showing exemplary scans for the disclosed system for space surveillance, in accordance with at least one embodiment of the present disclosure.

DESCRIPTION

The methods and apparatus disclosed herein provide an operative system for adaptive scan rate space surveillance sensors for super-geostationary earth orbit (super-GEO) orbits. In addition, the methods and apparatus disclosed herein provide an operative system for inclined super-GEO orbit for improved space-surveillance.

As previously mentioned above, currently, step-stare approaches are typically employed by sensors for space surveillance. Step-stare approaches capture a series of fields-of-views (FOVs) with small overlaps to surveill a larger field-of-regard (FOR). Reorienting the sensor to point to the next FOV position and allowing disturbances to settle after the reorienting requires additional time. However, methods that continuously scan across the field-of-regard at constant slew rates can minimize this additional time required. The use of a constant slew rate may result in better than required performance in many parts of the field-of-regard, but may also result insufficient performance in other parts and, thus, a constant slew rate can result in a far from optimal use of time.

In one or more embodiments, the system of the present disclosure provides an imaging sensor on a satellite platform in a super-GEO orbit that raster scans a desired sector of space. The scan rate is adjusted in response to the changing pointing geometry to provide a desired target dwell time as a function of a model of the characteristic brightness of a class of targets as a function of sensing and solar illumination geometry. This model may include such factors as (a) the range to the far side of the surveillance sector, (b) the solar phase angle, and (c) the target class characteristic size and reflective properties. The surveillance sector may be defined different ways depending on mission goals. One example would be an all Deep Space region that falls within the FOR. Here, Deep Space means the region from 5875 kilometers (km) to a few hundred km above the GEO radius (i.e. 35,786 km). This is a volume defined by the intersection of the parallelepiped with an apex at the sector location and edges defined by the FOR and a spherical shell from a radius of 5875 km to approximately 36,000 km. The range to the far side of this volume will depend on the position within the FOR.

The scan rate profile is optimized for these factors to minimize surveillance cycle time, while ensuring target performance goals are met or exceeded at all desired portions of the surveilled space sector. The surveillance profiles of each member of a constellation of several satellites are selected to maximize the target revisit rate and to eliminate coverage gaps by best using the strengths of each satellite's viewing geometry to cover the weaknesses of others.

The system of the present disclosure has two main points of novelty. The first main point of novelty is that the surveillance scan pattern for each satellite of a constellation can be adjusted as the satellites move around their orbits so as to most effectively use each satellite and to cover zones of weakness of individual satellites with the others. Such zones of weakness occur with geometries resulting in a poor phase angle, geometries with a long range to targets at the far side of the surveilled sector, or with geometries that cause the sensor to point close to a bright source, such as the sun, earth, or moon. The second main point of novelty is that by adjusting the slew rate as a function of range to the most distant part of the sector to be surveilled and the solar phase angle, surveillance cycle time can be minimized while ensuring target performance goals are met or exceeded at portions of the surveilled space sector.

By using the strengths of each satellite's viewing geometry to cover weaknesses of other satellites, the surveillance profiles of each member of a constellation of several satellites are selected to maximize target revisit rate and eliminate coverage gaps. An imaging sensor on a satellite in super-GEO orbit raster scans a part of space. The scan rate is adjusted to provide a desired target dwell time as a function of (a) the range to the far side of the space sector, (b) the solar phase angle, and (c) a small size target that is required to be readily detected. The scan rate profile is optimized for these three factors to minimize surveillance cycle time, while ensuring target performance goals are met or exceeded.

The system of the present disclosure avoids wasting unnecessary integration time at pointing geometries in which targets are easy to detect. By continuously scanning, it also avoids unproductive non-imaging time associated with step-stare approaches, which must stop imaging while the sensor is re-orientated and disturbances settle. The system of the present disclosure also addresses issues when a satellite may have geometric zones in which detecting dim targets is difficult or impossible. These zones can occur when (a) the fraction of light reflected by the sun is very low (poor phase angle), (b) the range to the targets at the far side of the volume to be surveilled is large, and/or (c) pointing near or directly at bright sources (such as the sun, earth, and the moon), which can cause high background light levels reducing target-to-background contrast and noise levels. The system of the present disclosure plans the surveillance scan pattern for each member of a constellation of satellites to best use the strengths of each satellite's viewing geometry to cover all zones to be surveilled maximizing target revisit rate and eliminating coverage gaps.

It should be noted that the dwell time on a target equals the field of view (FOV) of the sensor divided by the scan rate. Detection performance improves with increased dwell time. Commonly detection performance is described by the minimum size target for which a specified probability of detection (MDT=minimum detectable target, Pd=probability of detection). Detection performance is reduced for dimmer targets. Target brightness has a trend of decreasing with range squared and the solar phase angle (i.e. the angle between the sun-to-target line and the sensor-to-target line). Surveillance cycle refers to the time required to perform one full raster-scan over the field-of-regard spanned by the sector of space to be covered. The system of the present disclosure has two primary innovations. First, by adjusting the slew rate as a function of range to the most distant part of the sector to be surveilled and the model of target brightness as a function of sensing and solar illumination geometry, surveillance cycle time can be minimized while ensuring target performance goals are met or exceeded at all desired portions of the surveilled space sector. Second, the surveillance scan pattern for each satellite of a constellation is adjusted as the satellites move around their orbits so as to most effectively use each satellite to cover zones of weakness of individual satellites with the others.

In some embodiments, the system of the present disclosure provides a constellation of inclined super-GEO satellites that operate together to surveill the deep space orbital domain which includes, medium earth orbit (MEO), highly inclined orbit (HIO), geostationary earth orbit (GEO), and GEO-graveyard orbits. Inclined Super-GEO refers to roughly circular orbits with altitudes significantly higher than GEO and with an inclination relative to the equatorial plane. A constellation of satellites in the same inclined super-GEO orbit, spaced roughly equally about the circle, virtually eliminates any performance gaps related to earth and solar exclusion zones. Earth and solar exclusion zones refer to regions at which a single sensor has significantly degraded performance or is unable to perform because of stray light from these bright sources.

The system of the present disclosure, in some embodiments, uses inclined orbits to avoid bad geometries that align target objects to line up with the sun or earth. The inclined super-GEO orbit moves the earth-exclusion zones off of the GEO-belt during portions of the sensor's orbit that are difficult geometries for other satellites to cover.

It should be noted that surveillance of the space GEO belt is of high importance. The GEO belt is loosely considered to include orbits with mean motion of 0.99-1.01 days, and an eccentricity<0.01 days, and inclinations of up to ~10 degrees. Sensors in sub-GEO orbits (i.e. orbits that are lower than GEO) will be prone to solar exclusion zones, which cannot be viewed by any satellites. These are locations on the GEO belt at which (a) the sensor must look close to the sun to observe, which causes blinding background light, and (b) the side of the target viewed is primarily in shadow, not solar illuminated and thus is very dim (poor solar phase angles). A super-GEO constellation of three or more satellites avoids this issue, since all points on the GEO belt will be viewable by at least one super-GEO satellite with a geometry that is far from looking at the sun and has a good solar phase angle.

However, a new issue arises for super-GEO orbits, which is earth exclusion. For a single satellite looking at the nearest and farthest portions of the belt requires looking near to or directly at the earth, thereby causing strong background light levels, which reduces contrast and increases noise, and significantly reduces collection performance. Each individual satellite's earth exclusions can be covered by one of the other satellites of the constellation. However, for zero-inclination super-GEO orbits, when one satellite is at the portion of its orbit in which it is nearly between the sun and the earth, its exclusion zone lies at a location that is at a poor phase angle for the other satellites of the space situational awareness (SSA) constellation location at distant points of the orbit, thereby making it difficult to achieve good detection performance. This can be overcome in part by using a larger number of satellites, but this greatly increases cost. Another option is to incline the orbits such that the satellites are farthest from the equatorial plane when they are closest and farthest from the sun. A large enough inclination (e.g., greater than (>) 10 degrees) moves the earth exclusion zone off of the GEO belt for those difficult geometries. The earth exclusion zone will still align with the GEO belt during the portion of the orbit that crosses through the equatorial plane, but at those points, other satellites of the constellation will be able to see that portion of the belt with a favorable geometry (e.g., a good solar phase angle).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to sensors for space surveillance, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1A is a diagram 100 depicting the solar phase angle 110 between the sun 120 and a sensor 130 on a satellite 140 that may be employed for the disclosed system for space surveillance, in accordance with at least one embodiment of the present disclosure. In this figure, a sensor 130 on a satellite 140 in super-GEO orbit is shown to be sensing an object 170 in space. The solar phase angle 110 is shown to be between the sun-to-object line 150 and the sensor-to-object line 160.

It should be noted that during operation of the sensor 130, the sensor 130 scans a raster scan over a field of regard (FOR), which includes the object 170. The scanning is at a variable rate, which is dependent upon the target dwell time for detecting a target of interest (e.g., the object 170). The target dwell time is a function of the range from the sensor 130 to the target of interest 170, and a function of the solar phase angle 110.

In one or more embodiments, super-GEO orbit is an orbit has a radius that is larger than a GEO radius for a majority of a duration of an orbital cycle. Super-GEO includes both orbits that are nearly circular as well as elliptical orbits with apogee's above GEO radius, but with which may dip below the GEO altitude near perigee. Super-GEO includes both orbits with near-zero inclination as well as inclined orbits.

In some embodiments of the present disclosure, super-GEO orbit is at an altitude approximately twenty percent (20%) higher than GEO (e.g., 1.2*35,786 km=42,900 km). However, it should be noted that super-GEO may be any orbit higher than GEO for which it has a larger radius than GEO for the majority of the duration of the orbit cycle, such as 1.05 times higher than GEO, 1.5 times higher than GEO, etc. Super-GEO also includes elliptical orbits with apogee's above GEO, but with perigee's that can be below or above GEO.

It should be noted that in some embodiments, the satellite 140 is in an inclined super-GEO orbit. Phase angle will vary with position within the FOR. The profile of these variations will depend on orbit inclination, and the current position of a satellite within its orbit and on season. Choosing a non-zero inclination can favorably adjust these dependencies to give the best performance for the constellation of satellites as a system, such that at spatial and temporal zones in which the performance of one satellite may be poor, another satellite in the system has good performance.

Figure 1B:
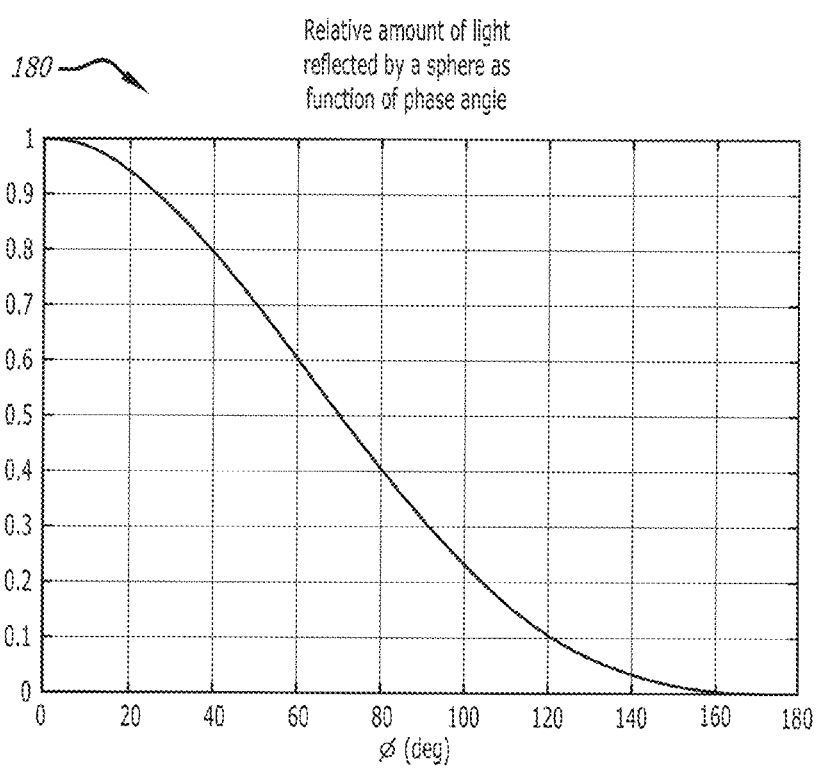
FIG. 1B is a graph showing the relative amount of light reflected by a sphere as a function of the solar phase angle, in accordance with at least one embodiment of the present disclosure.

FIG. 1B is a graph 180 showing the relative amount of light reflected by a sphere as a function of the solar phase angle 110 (refer to FIG. 1A), in accordance with at least one embodiment of the present disclosure. In this figure, the x-axis of the graph 180 represents the solar phase angle 110 in degrees, and the y-axis of the graph 180 represents a relative amount of light reflected by a sphere. As such, as shown in graph 180, as the solar phase angle 110 increases, the relative amount of light reflected decreases. Note that the brightness of real-life objects has more complicated dependencies due to their three-dimensional (3D) surface structure and optical properties of the surface materials; but the trend is that objects will generally appear brighter at smaller phase angles.

Figure 2:
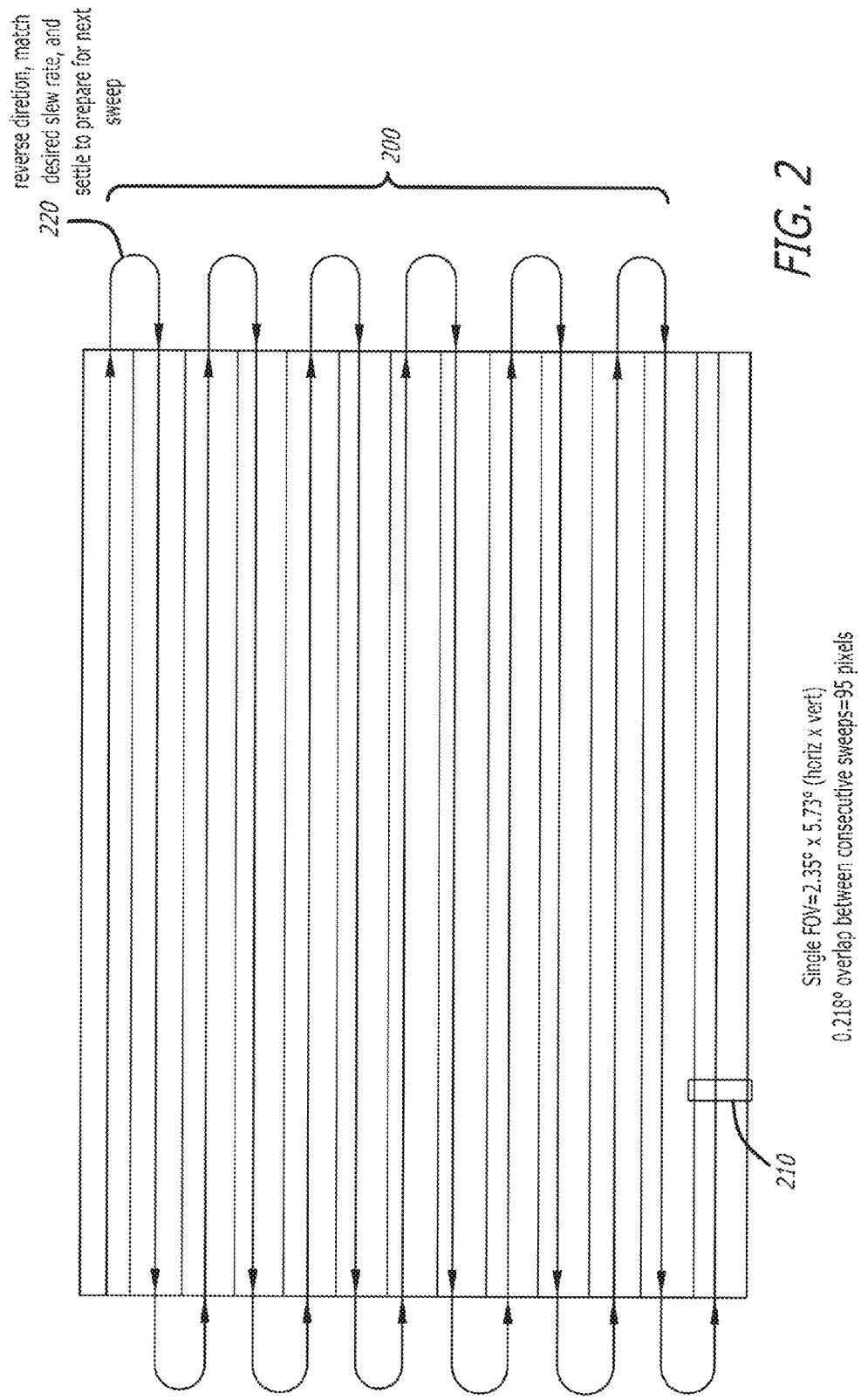
FIG. 2 is a diagram showing an exemplary raster scan that may be performed by a sensor for the disclosed system for space surveillance, in accordance with at least one embodiment of the present disclosure.

FIG. 2 is a diagram showing an exemplary raster scan 200 that may be performed by a sensor 130 (refer to FIG. 1A) for the disclosed system for space surveillance, in accordance with at least one embodiment of the present disclosure. In this figure, the exemplary raster scan 200 is shown to include thirteen (13) sweeps. For this exemplary raster scan 200, the field of regard (FOR) is 115.7 degrees (horizontal) by 82.9 degrees (vertical). And, each single field of view (FOV) 210 is 2.35 degrees (horizontal) by 5.73 degrees (vertical). For this example, there is 0.218 degrees of overlap between consecutive sweeps, which is equal to 95 pixels. After one sweep of the raster scan 200 is performed 220, the direction for the next sweep is reversed, the desired slew rate is matched, and the sensor settles to prepare for the next subsequent sweep. As such, as shown in the raster scan 200, the raster scan 200 comprises at least one sweep. In one or more embodiments, at least one sweep is a continuous sweep.

Figure 3A:
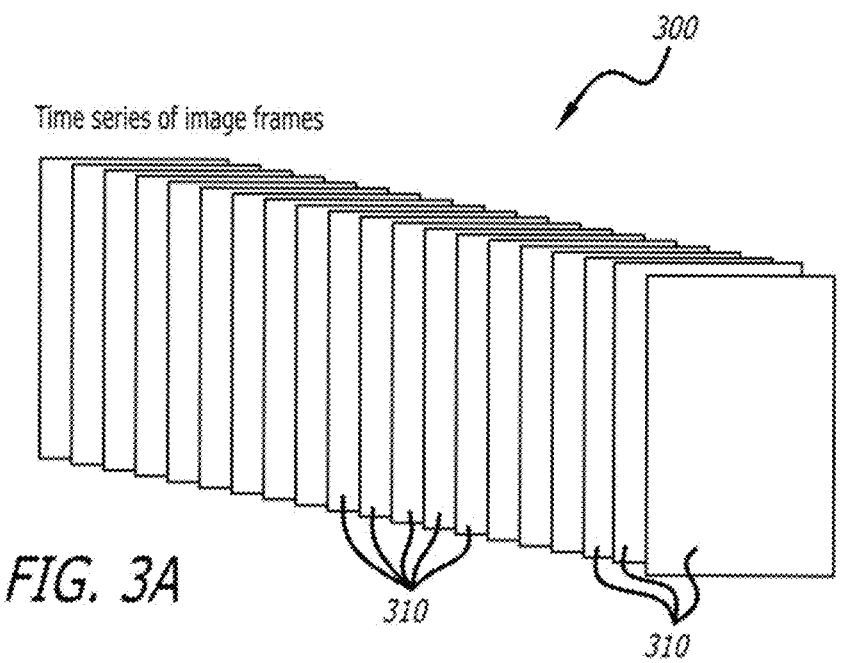
FIG. 3A is a diagram showing a time series of image frames that may be collected by a sensor for the disclosed system for space surveillance, in accordance with at least one embodiment of the present disclosure.

FIG. 3A is a diagram 300 showing a time series of image frames 310 that may be collected by a sensor 110 (refer to FIG. 1A) for the disclosed system for space surveillance, in accordance with at least one embodiment of the present disclosure. In this figure, a time series of image frames 310 are shown. During operation of the sensor 110 (refer to FIG. 1A), during the scanning, the sensor 110 collects the image frames 310 overtime. In FIG. 3A, the image frames 310 are shown to overlap.

Figure 3B:
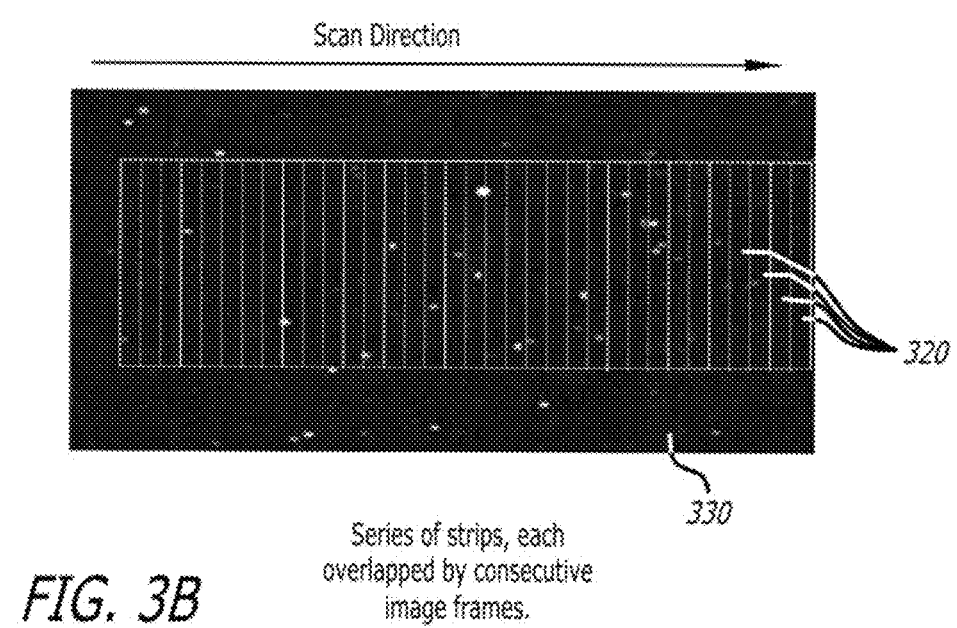
FIG. 3B is a diagram showing a series of strips of the scanned area, in accordance with at least one embodiment of the present disclosure.

FIG. 3B is a diagram 330 showing a series of strips 320 of the scanned area, in accordance with at least one embodiment of the present disclosure. During processing by the sensor 110 (refer to FIG. 1A), the scanned area is divided into a series of strips 320. Each strip 320 is contained within X number (e.g., eight) image frames 310 (refer to FIG. 3A). For each strip 320, sections from the image frames 310 covering the strip 320 are extracted to synthesize a stack of frames 310 emulating collection by a staring and framing camera.

During operation of the sensor 110, after the sensor 110 has collected the image frames 310, the sensor 110 compares a detected brightness level in at least one of the image frames 310 to a detection threshold. The sensor 110 determines that the target of interest is present when the detected brightness level in at least one of the image frames 310 exceeds the detection threshold. And, the sensor 110 determines that the target of interest is not present when the detected brightness level in at least one of the image frames 310 does not exceed the detection threshold.

Figure 4A:
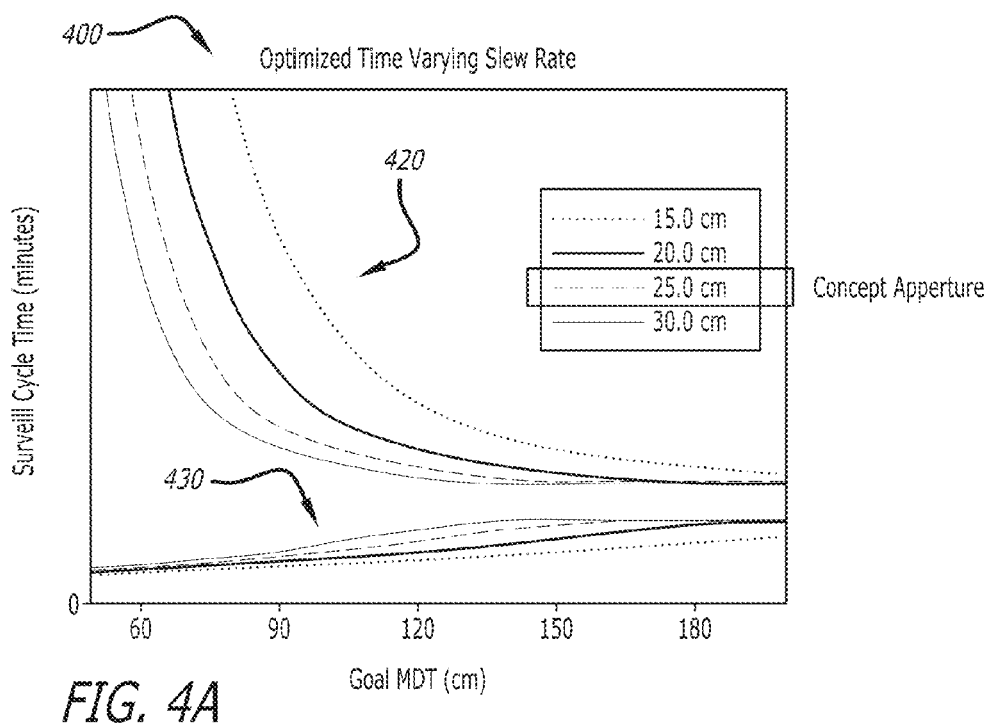
FIG. 4A is a graph showing the surveillance cycle time as a function of the goal minimum detectable target (MDT) size for an optimized time varying slew rate for the disclosed system for space surveillance, in accordance with at least one embodiment of the present disclosure.

FIG. 4A is a graph 400 showing the surveillance cycle time as a function of the goal minimum detectable target (MDT) size for an optimized time varying slew rate for the disclosed system for space surveillance, in accordance with at least one embodiment of the present disclosure. In this figure, the x-axis of the graph 400 represents the goal MDT in centimeters (cm), and the y-axis of the graph 400 represents the surveillance cycle time in minutes.

Figure 4B:
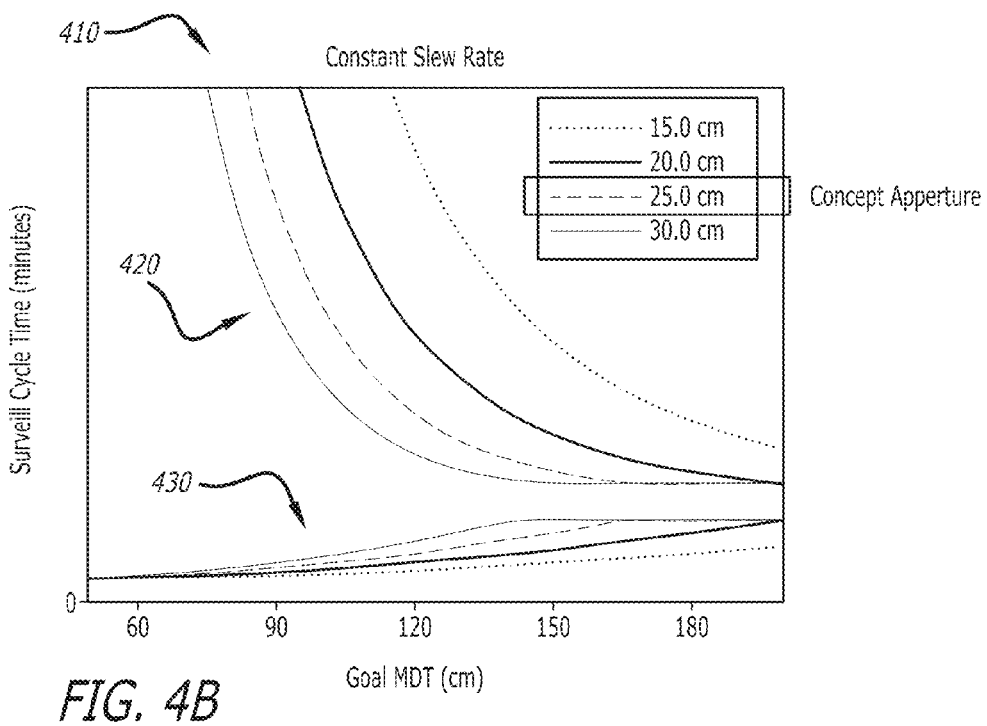
FIG. 4B is a graph showing the surveillance cycle time as a function of the goal MDT size for a constant slew rate.

FIG. 4B is a graph 410 showing the surveillance cycle time as a function of the goal MDT size for a constant slew rate. In this figure, the x-axis of the graph 410 represents the goal MDT in centimeters (cm), and the y-axis of the graph 400 represents the surveillance cycle time in minutes.

In graphs 400 and 410, curves 420 represent the total time, and curves 430 represent the non-imaging time. The non-imaging time curves 430 each represent the total amount of time needed for the sensor 110 to reverse direction and settle between the consecutive horizontal sweeps (refer to FIG. 2 to view the horizontal sweeps) of the raster scan 200 (refer to FIG. 2).

For graphs 400 and 410, a fixed instantaneous FOV (IFOV) of 40 micro radians (μ rad) and a fixed altitude of the sensor at super-GEO at eight (8) million meters (Mm) above GEO orbit is utilized. The curves 420 and 430 vary by utilizing different aperture diameters (e.g., an aperture size of 25.0 cm is used for the concept) for the sensor 110. The graphs 400 and 410 show that using an optimized slew rate significantly reduces the surveillance cycle time than using a constant slew rate. For example, with a twenty-five (25) centimeter (cm) diameter aperture, the surveillance cycle time at ninety (90) cm MDT is reduced by about two (2).

Figure 5:
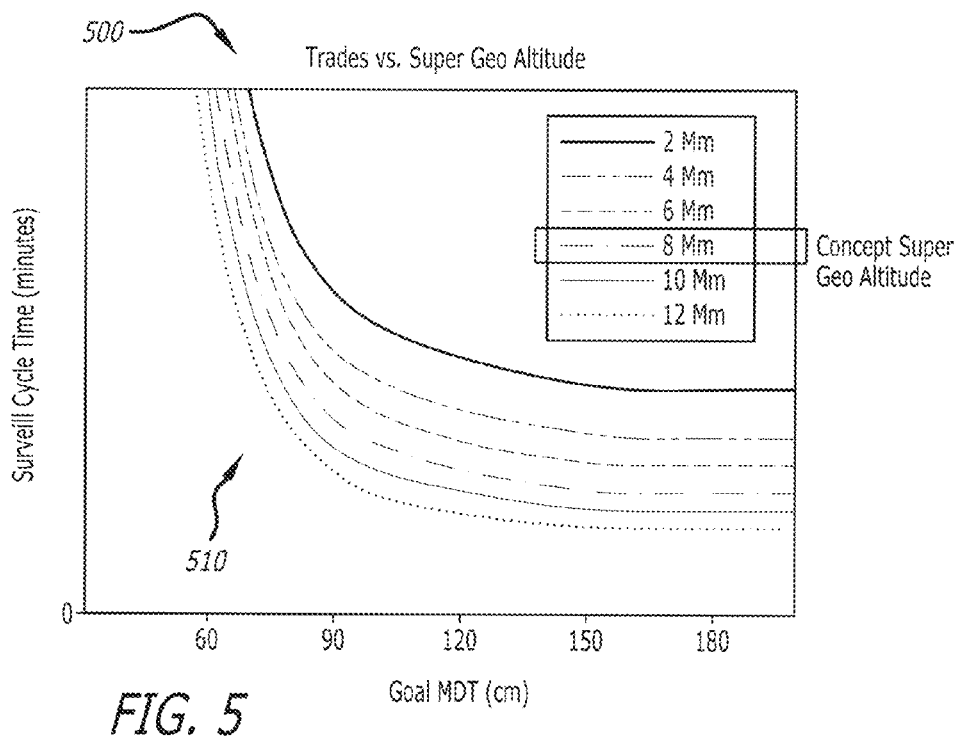
FIG. 5 is a graph showing the surveillance cycle time as a function of the goal MDT size for different sensor altitudes using an optimized time varying slew rate for the disclosed system for space surveillance, in accordance with at least one embodiment of the present disclosure.

FIG. 5 is a graph 500 showing the surveillance cycle time as a function of the goal MDT size for different sensor altitudes using an optimized time varying slew rate for the disclosed system for space surveillance, in accordance with at least one embodiment of the present disclosure. In this figure, the x-axis of the graph 500 represents the goal MDT in centimeters (cm), and the y-axis of the graph 500 represents the surveillance cycle time in minutes. For graph 500, a fixed instantaneous FOV (IFOV) of 40 micro radians (μ rad) and a fixed aperture size of 25.0 cm for the sensor 110 (refer to FIG. 1A) is utilized. The curves 510 vary by utilizing different altitudes for the sensor 110 (e.g., an altitude of super-GEO at 8 Mm is used for the concept).

Figure 6:
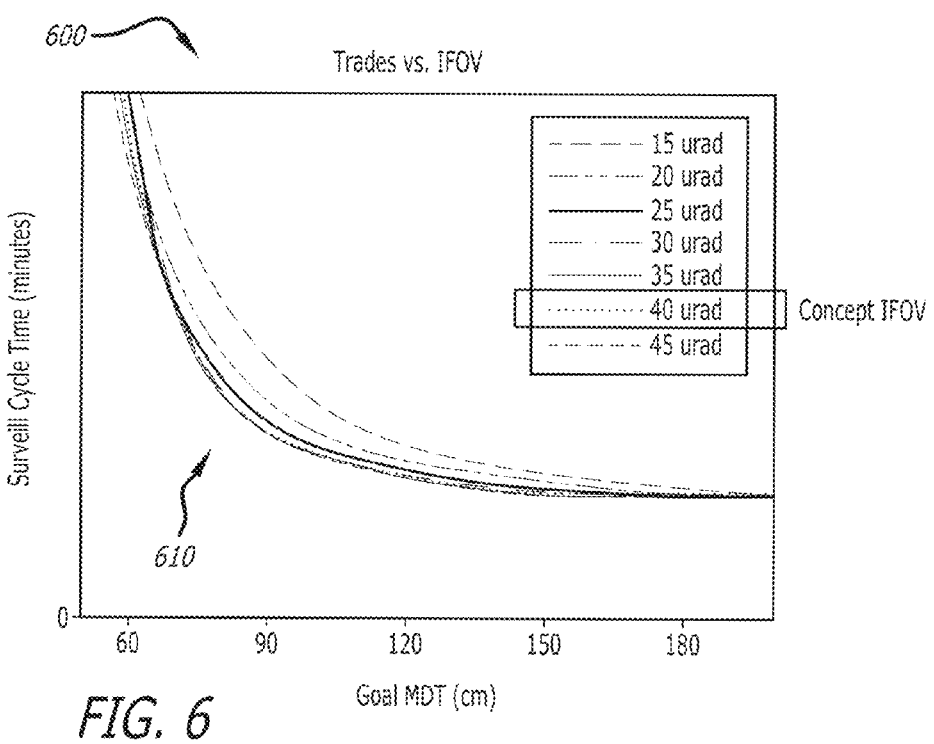
FIG. 6 is a graph showing the surveillance cycle time as a function of the goal MDT size for different instantaneous field of views (IFOVs) using an optimized time varying slew rate for the disclosed system for space surveillance, in accordance with at least one embodiment of the present disclosure. The y-axis scale is the same as for FIG. 5.

FIG. 6 is a graph 600 showing the surveillance cycle time as a function of the goal MDT size for different instantaneous field of views (IFOVs) using an optimized time varying slew rate for the disclosed system for space surveillance, in accordance with at least one embodiment of the present disclosure. In this figure, the y-axis scale is the same as for FIG. 5. Also in this figure, the x-axis of the graph 600 represents the goal MDT in centimeters (cm), and the y-axis of the graph 600 represents the surveillance cycle time in minutes. For graph 600, a fixed altitude for the sensor 110 (refer to FIG. 1A) of super-GEO at 8 Mm and a fixed aperture size of 25.0 cm for the sensor 110 is utilized. The curves 610 vary by utilizing different IFOVs (e.g., an IFOV of 40μ rad is used for the concept).

Figure 7:
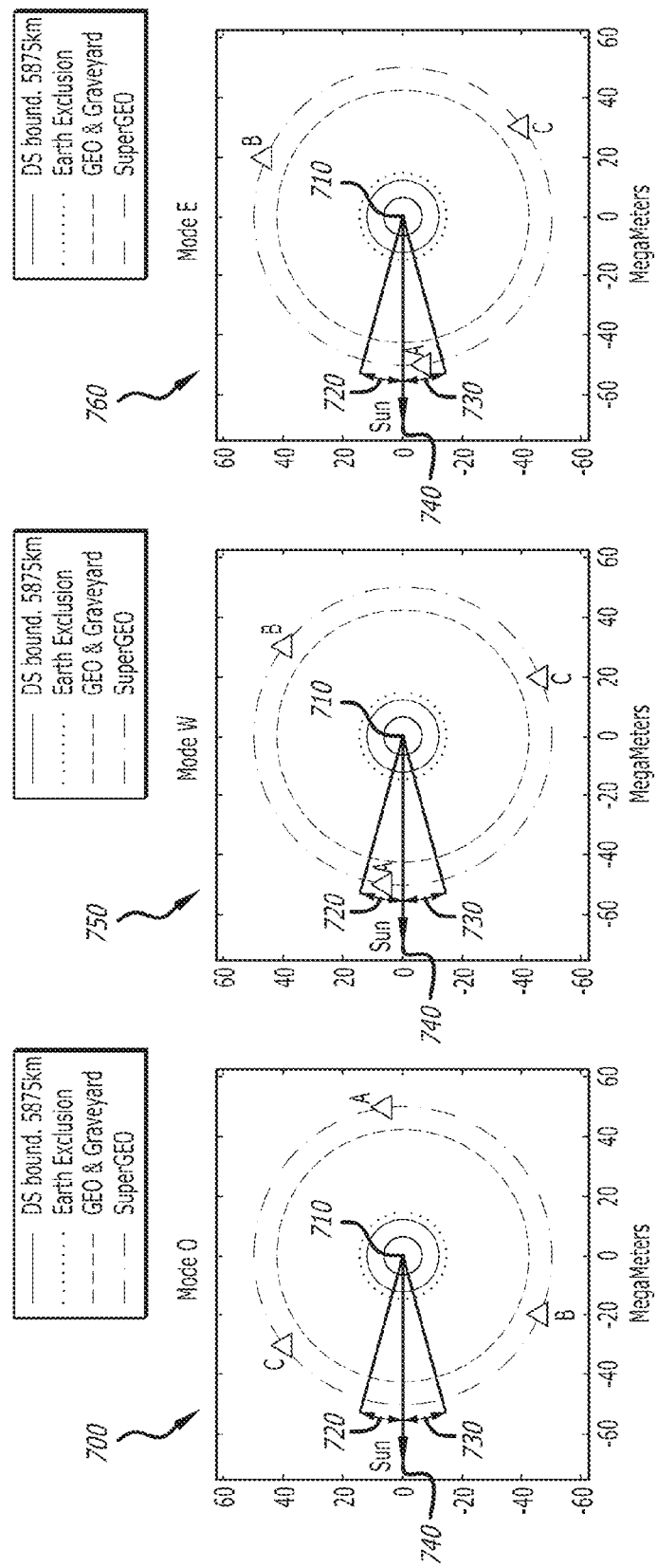
FIG. 7A is a diagram of the disclosed system for space surveillance for Mode O of operation, in accordance with at least one embodiment of the present disclosure.
FIG. 7B is a diagram of the disclosed system for space surveillance for Mode W of operation, in accordance with at least one embodiment of the present disclosure.
FIG. 7C is a diagram of the disclosed system for space surveillance for Mode E of operation, in accordance with at least one embodiment of the present disclosure.

FIGS. 7A, 7B, and 7C shows diagrams 700, 750, 760 of the disclosed system for space surveillance different Modes of operation, in accordance with at least one embodiment of the present disclosure. In these figures, three sensors A, B, C on satellites in super-GEO orbit are shown to be orbiting earth 710. Also shown in these figures are the deep space (DS) bound orbit (5875 kilometers (km)), the earth exclusion zone, and the GEO and graveyard orbits.

FIG. 7A is a diagram 700 of the disclosed system for space surveillance for Mode O of operation, in accordance with at least one embodiment of the present disclosure. In this figure, for Mode O, no sensors A, B, C are shown to be located within the west sector 720 or east sector 730 of the sun 740.

FIG. 7B is a diagram 750 of the disclosed system for space surveillance for Mode W of operation, in accordance with at least one embodiment of the present disclosure. In this figure, for Mode W, sensor A is shown to be located within the west sector 720 of the sun 740.

FIG. 7C is a diagram 760 of the disclosed system for space surveillance for Mode E of operation, in accordance with at least one embodiment of the present disclosure. In this figure, for Mode E, sensor A is shown to be located within the east sector 730 of the sun 740.

FIGS. 8A, 8B, 8C, and 8D shows diagrams 800, 820, 830, 840 of the disclosed system for space surveillance for Mode O of operation, in accordance with at least one embodiment of the present disclosure. In these figures, three sensors A, B, C on satellites in super-GEO orbit are shown to be orbiting earth 810. Also shown in these figures are the deep space (DS) bound orbit (5875 kilometers (km)), the earth exclusion zone, and the GEO and graveyard orbits.

Figure 8:
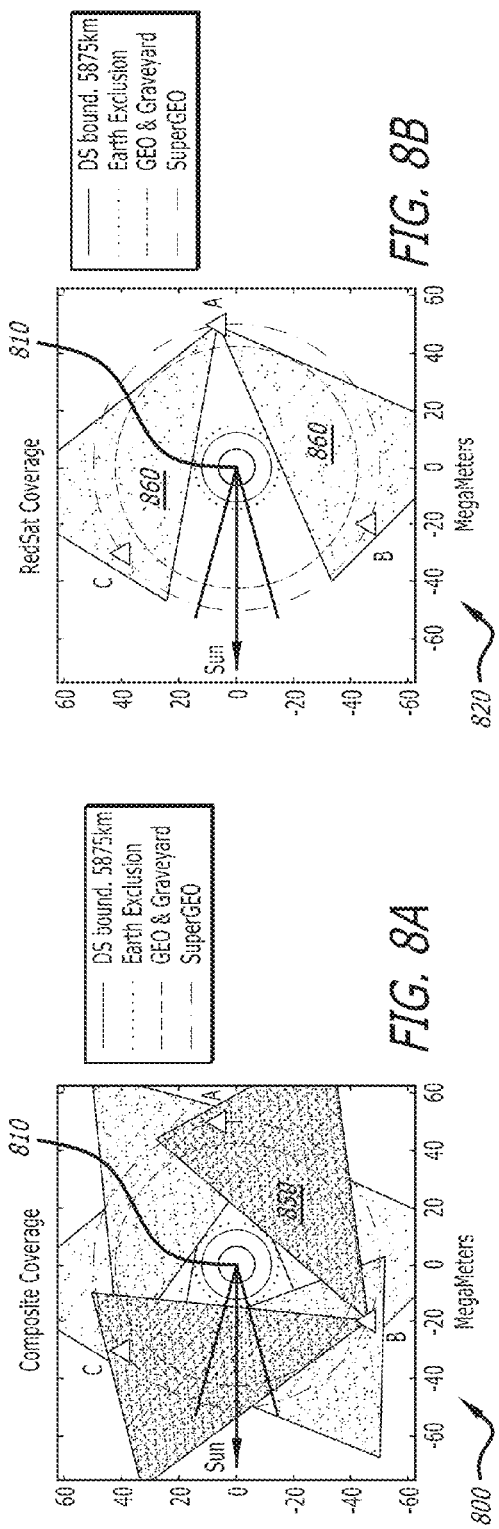
FIG. 8A is a diagram of the disclosed system for space surveillance for Mode O of operation showing the composite coverage, in accordance with at least one embodiment of the present disclosure.
FIG. 8B is a diagram of the disclosed system for space surveillance for Mode O of operation showing the coverage for sensor A, in accordance with at least one embodiment of the present disclosure.
FIG. 8C is a diagram of the disclosed system for space surveillance for Mode O of operation showing the coverage for sensor B, in accordance with at least one embodiment of the present disclosure.
FIG. 8D is a diagram of the disclosed system for space surveillance for Mode O of operation showing the coverage for sensor C, in accordance with at least one embodiment of the present disclosure.

FIG. 8A is a diagram 800 of the disclosed system for space surveillance for Mode O of operation showing the composite coverage 850, in accordance with at least one embodiment of the present disclosure. This figure shows the composite coverage 850 area that comprises of coverage areas 860, 870, 880 (refer to FIGS. 8B, 8C, and 8D) from sensors A, B, and C.

During operation for Mode O, each sensor A, B, C sweeps 115.7 degrees by 82.9 degrees (FOR) centered on nadir of the satellite of the sensor A, B, C. The phasing of the sweeps can be selected to interleave revisits between sensors and minimize maximum revisit times. The FOR covers (refer to composite coverage area 850) all of the GEO belt up to 10 degrees inclination, except for a 10 degree by 19 degree hole in the middle of the earth exclusion gap. This corresponds to a tangent height of 8544 km altitude. The composite coverage 850 covers all of the GEO belt, thereby achieving the goal MDT or better at all points. The composite coverage 850 also covers most of the deep space (DS) (e.g., MEOs, HIOs, and high inclination GEOs).

FIG. 8B is a diagram 820 of the disclosed system for space surveillance for Mode O of operation showing the coverage for sensor A, in accordance with at least one embodiment of the present disclosure. This figure shows the coverage areas 860 from sensor A.

FIG. 8C is a diagram 830 of the disclosed system for space surveillance for Mode O of operation showing the coverage for sensor B, in accordance with at least one embodiment of the present disclosure. This figure shows the coverage areas 870 from sensor B.

FIG. 8D is a diagram 840 of the disclosed system for space surveillance for Mode O of operation showing the coverage for sensor C, in accordance with at least one embodiment of the present disclosure. This figure shows the coverage areas 880 from sensor C.

Figure 9:
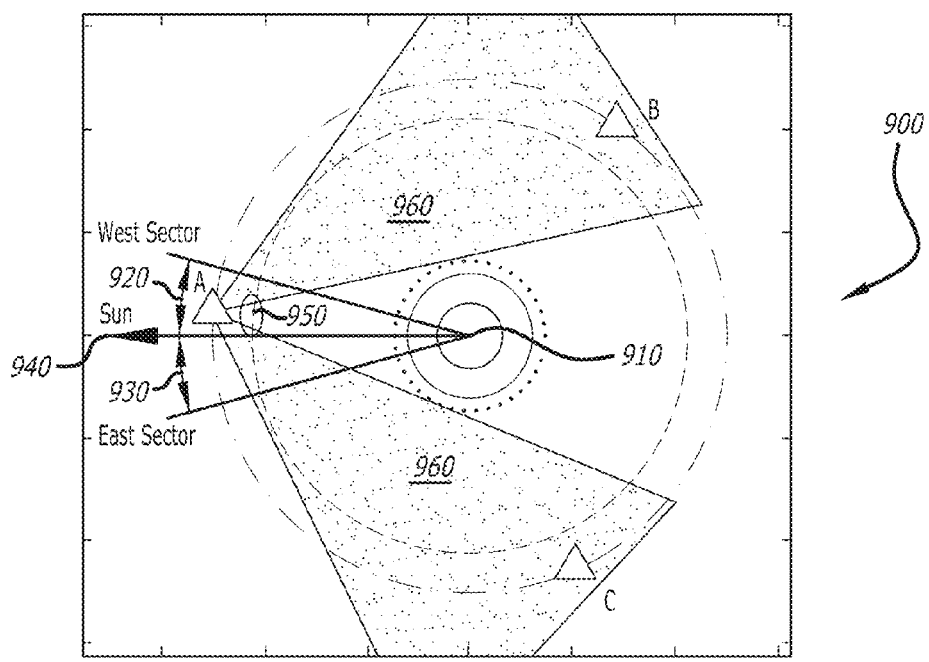
FIG. 9 is a diagram of the disclosed system for space surveillance for Mode W or E of operation showing the coverage for sensor A, in accordance with at least one embodiment of the present disclosure.

FIG. 9 is a diagram 900 of the disclosed system for space surveillance for Mode W or E of operation showing the coverage for sensor A, in accordance with at least one embodiment of the present disclosure. In this figure, three sensors A, B, C on satellites in super-GEO orbit are shown to be orbiting earth 910. Sensor A is shown to be located within the west sector 920 of the sun 940 and is shown to have coverage areas 960. This figure shows that when a sensor is located in the west sector or east sector of the sun (e.g., sensor A is located in the west sector 920 of the sun 940) the other sensors (e.g., Sensors B and C) each have a poor solar phase angle for covering the earth exclusion gap in the indicated region 950.

Figure 10:
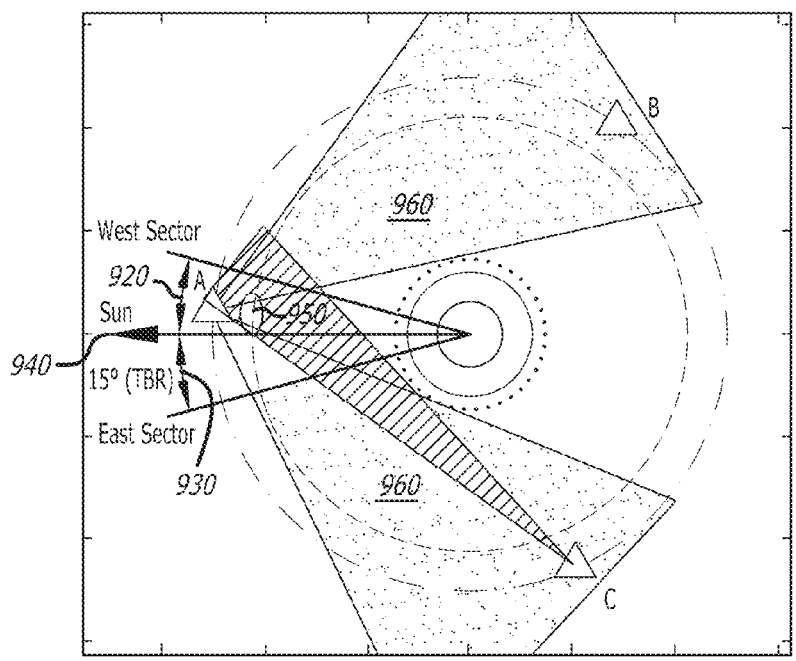
FIG. 10 is a diagram of the disclosed system for space surveillance for Mode W or E of operation showing the coverage for sensor A and sensor C, in accordance with at least one embodiment of the present disclosure.

FIG. 10 is a diagram of the disclosed system for space surveillance for Mode W or E of operation showing the coverage for sensor A and sensor C, in accordance with at least one embodiment of the present disclosure. The solution to cover the earth exclusion gap for sensor A (i.e. the indicated region 950) is to use the coverage area from the sensor with the best solar phase angle. In this example, sensor C has the best solar phase angle. Sensor C surveills just the indicated region 950. This allows for sensor C to use longer integration times and more image frames to achieve a small MDT for the indicated region 950.

FIGS. 11A, 11B, 11C, and 11D shows diagrams 1100, 1120, 1130, 1140 of the disclosed system for space surveillance for Mode W or E of operation, in accordance with at least one embodiment of the present disclosure. In these figures, three sensors A, B, C on satellites in super-GEO orbit are shown to be orbiting earth 1110. Also shown in these figures are the deep space (DS) bound orbit (5875 kilometers (km)), the earth exclusion zone, and the GEO and graveyard orbits.

Figure 11A:
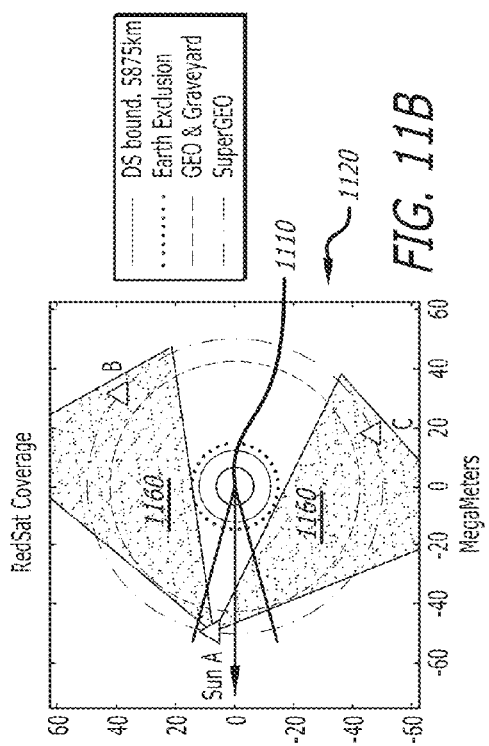
FIG. 11A is a diagram of the disclosed system for space surveillance for Mode W or E of operation showing the composite coverage, in accordance with at least one embodiment of the present disclosure.

FIG. 11A is a diagram 1100 of the disclosed system for space surveillance for Mode W or E of operation showing the composite coverage, in accordance with at least one embodiment of the present disclosure. This figure shows the composite coverage 1150 area that comprises of coverage areas 1160, 1170, 1180 (refer to FIGS. 11B, 11C, and 11D) from sensors A, B, and C. In this figure, since sensor A is shown to be in the west sector 1190 of the sun 1195, Mode W is utilized during operation.

During operation for Mode W, sensor A, which is in the west sector 1190 of the sun 1195, and sensor B, which is the farthest from the sun 1195, operate in Mode O (which is described above in the description of FIG. 8A) by performing sweeps of 115.7 degrees by 82.9 degrees (FOR) centered on nadir. Sensor C limits its surveillance FOR to covering the earth exclusion gap for sensor A. Sensor C uses longer integration times and more image frames to achieve a small MDT.

It should be noted that if a sensor is located in the east sector 1192 of the sun 1195, Mode E is utilized during operation. Mode E is performed similar to Mode W except that Mode E is performed the symmetrically opposite of Mode W.

Figure 11B:
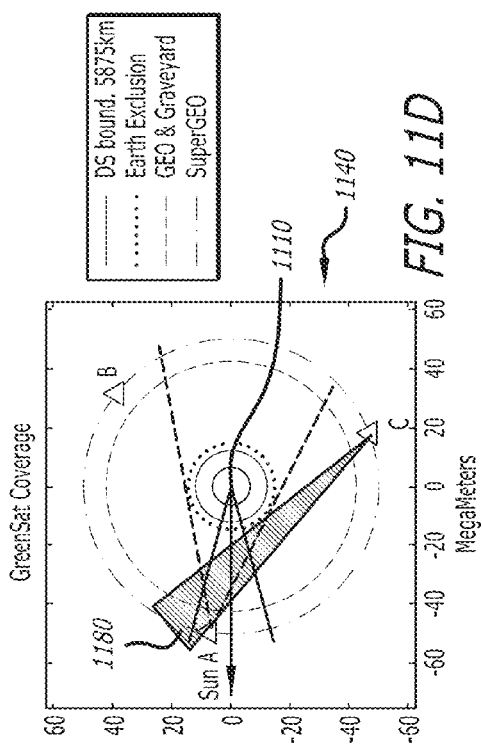
FIG. 11B is a diagram of the disclosed system for space surveillance for Mode W or E of operation showing the coverage for sensor A, in accordance with at least one embodiment of the present disclosure.

FIG. 11B is a diagram 1120 of the disclosed system for space surveillance for Mode W or E of operation showing the coverage for sensor A, in accordance with at least one embodiment of the present disclosure. This figure shows the coverage areas 1160 from sensor A.

Figure 11C:
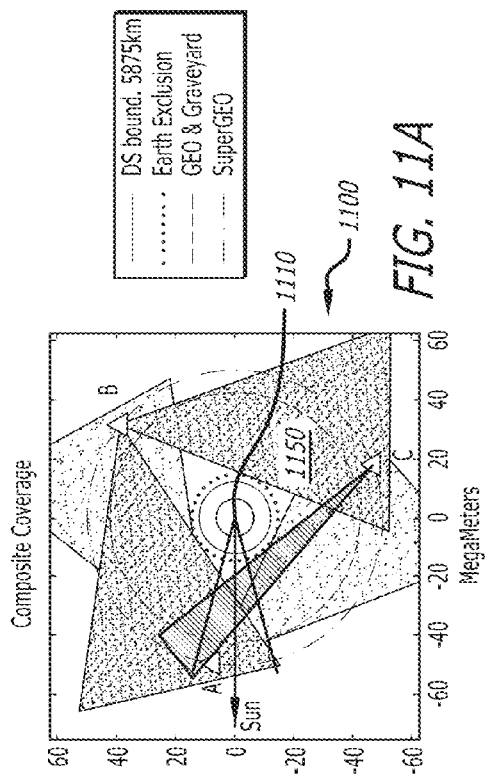
FIG. 11C is a diagram of the disclosed system for space surveillance for Mode W or E of operation showing the coverage for sensor B, in accordance with at least one embodiment of the present disclosure.

FIG. 11C is a diagram 1130 of the disclosed system for space surveillance for Mode W or E of operation showing the coverage for sensor B, in accordance with at least one embodiment of the present disclosure. This figure shows the coverage areas 1170 from sensor B.

Figure 11D:
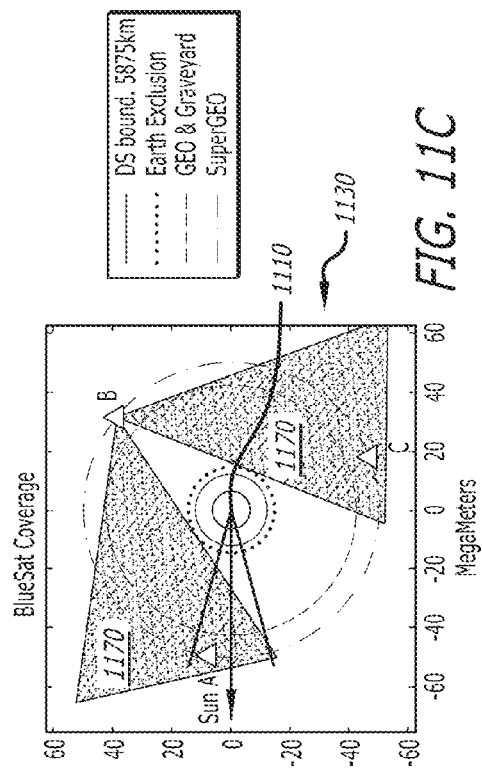
FIG. 11D is a diagram of the disclosed system for space surveillance for Mode W or E of operation showing the coverage for sensor C, in accordance with at least one embodiment of the present disclosure.

FIG. 11D is a diagram 1140 of the disclosed system for space surveillance for Mode W or E of operation showing the coverage for sensor C, in accordance with at least one embodiment of the present disclosure. This figure shows the coverage areas 1180 from sensor C.

Figure 12B:
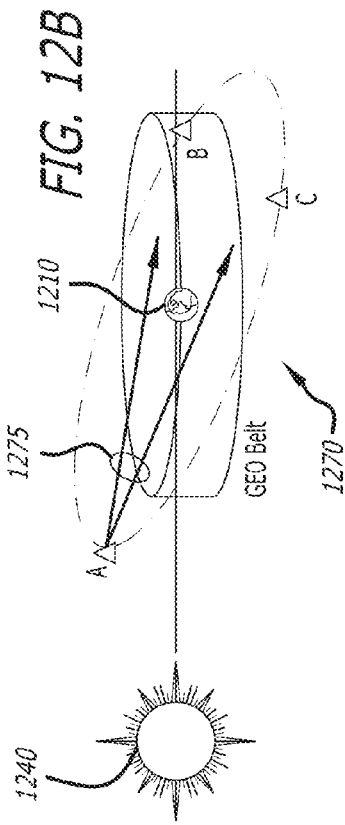
FIG. 12B is a diagram of the disclosed system for space surveillance for Mode W or E of operation showing the coverage for sensor A when employing an inclined orbit, in accordance with at least one embodiment of the present disclosure.
Figure 12C:
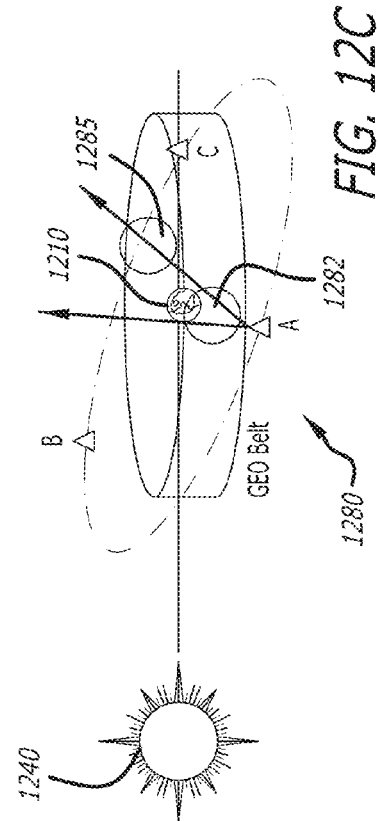
FIG. 12C is a diagram of the disclosed system for space surveillance for Mode O of operation showing the coverage for sensor A when employing an inclined orbit, in accordance with at least one embodiment of the present disclosure.
Figure 12A:
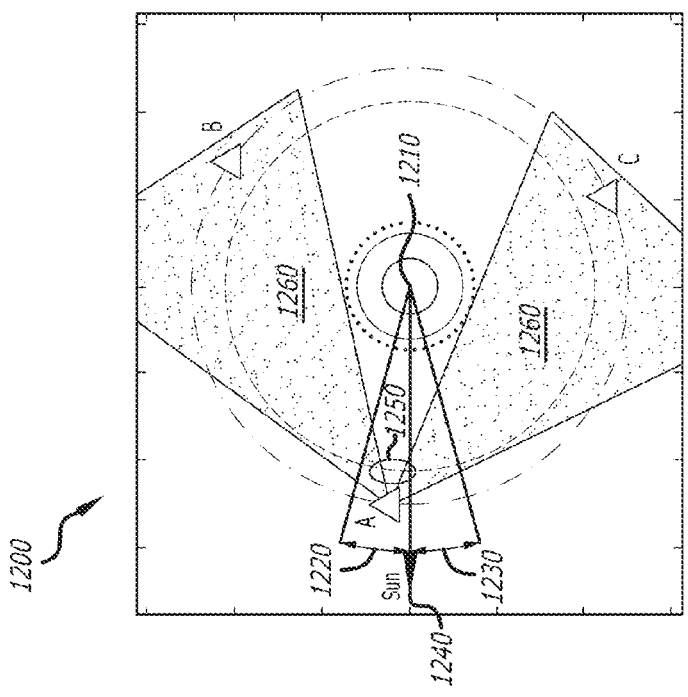
FIG. 12A is a diagram of the disclosed system for space surveillance for Mode W or E of operation showing the coverage for sensor A, in accordance with at least one embodiment of the present disclosure.

FIG. 12A is a diagram 1200 of the disclosed system for space surveillance for Mode W or E of operation showing the coverage for sensor A, in accordance with at least one embodiment of the present disclosure. In this figure, three sensors A, B, C on satellites in super-GEO orbit are shown to be orbiting earth 1210. In this figure, sensor A is shown to be located within the west sector 1220 of the sun 1240 and is shown to have coverage areas 1260. This figure shows that when a sensor is located in the west sector or east sector of the sun (e.g., sensor A is located in the west sector 1220 of the sun 1240), the other sensors (e.g., sensors B and C) each have a poor solar phase angle for covering the earth exclusion gap in the indicated region 1250.

FIG. 12B is a diagram 1270 of the disclosed system for space surveillance for Mode W or E of operation showing the coverage for sensor A when employing an inclined orbit, in accordance with at least one embodiment of the present disclosure. In this figure, the sensors A, B, and C are on satellites in an inclined super-GEO orbit. The inclining orbit moves the exclusion zone 1275 off of the GEO belt for the most difficult geometry. The axis of inclination is chosen so that the exclusion zone 1275 is farthest off of the GEO belt when the sensor (e.g., sensor A) is at portions of the orbit closest and farthest from the sun 1240.

FIG. 12C is a diagram 1280 of the disclosed system for space surveillance for Mode O of operation showing the coverage for sensor A when employing an inclined orbit, in accordance with at least one embodiment of the present disclosure. In this figure, the sensors A, B, and C are on satellites in an inclined super-GEO orbit. When a sensor (e.g., Sensor A) is located at a section of the super-GEO orbit in between the closest and farthest points from the sun, its exclusion zones 1282, 1285 will start to overlap with the GEO belt. However, for this geometry, the other sensors (e.g., Sensors B and C) will have favorable solar phase angles.

Figure 13:
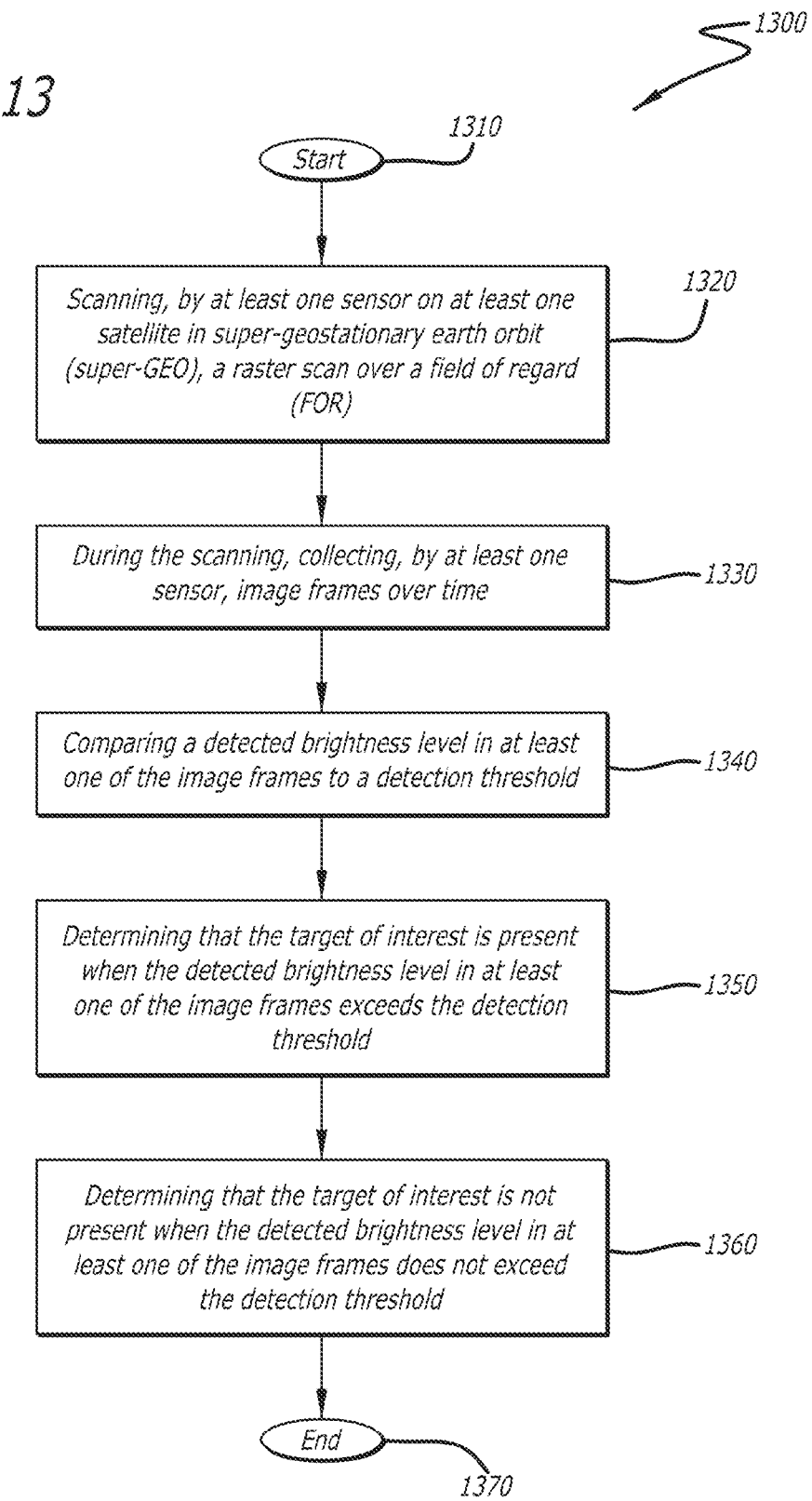
FIG. 13 is a flow chart depicting the disclosed method for space surveillance, in accordance with at least one embodiment of the present disclosure.

FIG. 13 is a flow chart depicting the disclosed method 1300 for space surveillance, in accordance with at least one embodiment of the present disclosure. At the start 1310 of the method 1300, at least one sensor on a satellite in super-GEO orbit scans a raster scan over a field of regard (FOR) 1320. In one or more embodiments, the scanning is at a variable rate, which is dependent upon a target dwell time for detecting a target of interest. In at least one embodiment, the target dwell time is a function of the range from at least one sensor to the target of interest and a function of the solar phase angle.

During the scanning, at least one sensor collects image frames over time. 1330. In one or more embodiments, the image frames overlap.

Then, at least one sensor compares a detected brightness level in at least one of the image frames to a detection threshold 1340. At least one sensor determines that the target of interest is present when the detected brightness level for at least one of the image frames exceeds the detection threshold 1350. Also, at least one sensor determines that the target of interest is not present when the detected brightness level for at least one of the images frames does not exceed the detection threshold 1360. Then, the method 1300 ends 1370.

Figure 14:
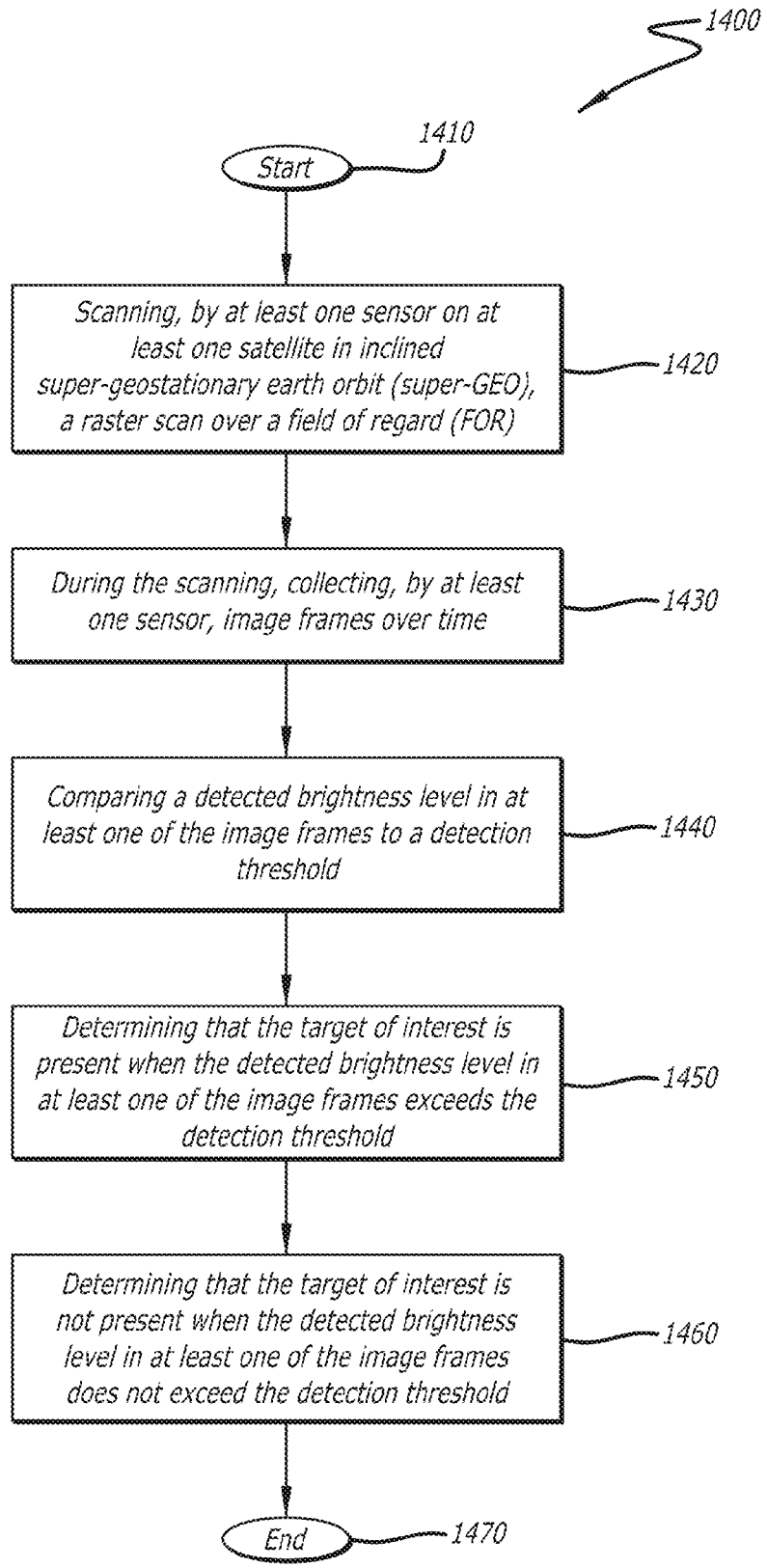
FIG. 14 is a flow chart depicting the disclosed method for space surveillance employing an inclined orbit, in accordance with at least one embodiment of the present disclosure.

FIG. 14 is a flow chart depicting the disclosed method 1400 for space surveillance employing an inclined orbit, in accordance with at least one embodiment of the present disclosure. At the start 1410 of the method 1400, at least one sensor on a satellite in inclined super-GEO orbit scans a raster scan over a field of regard (FOR) 1420. In one or more embodiments, the scanning is at a variable rate, which is dependent upon a target dwell time for detecting a target of interest. In at least one embodiment, the target dwell time is a function of the range from at least one sensor to the target of interest and a function of the solar phase angle. In one or more embodiments, an axis of inclination of the inclined super-GEO orbit is elliptical such that its apogee is higher than GEO and its perigee is below or above the GEO radius, but is such that for the majority of the time of an orbit cycle of the satellite is at a radius above GEO.

During the scanning, at least one sensor collects image frames over time. 1430. In one or more embodiments, the image frames overlap.

Then, at least one sensor compares a detected brightness level in at least one of the image frames to a detection threshold 1440. At least one sensor determines that the target of interest is present when the detected brightness level for at least one of the image frames exceeds the detection threshold 1450. Also, at least one sensor determines that the target of interest is not present when the detected brightness level for at least one of the images frames does not exceed the detection threshold 1460. Then, the method 1400 ends 1470.

FIG. 15 shows exemplary formulas for a MDT model that may be employed by the disclosed system for space surveillance, in accordance with at least one embodiment of the present disclosure. In this figure, the formula 1500 for the threshold-to-noise-ratio (TNR) (e.g., detection threshold), the formula 1510 for the pixel electron count (d), and the formula 1520 for the probability of detecting a target within a single frame ($P_z$) are shown. For this MDT model, the target signal level S that achieves the desired $P_z$ (probability of detecting a target within a single frame) is solved for.

FIG. 16 shows exemplary formulas for a multi-pixel streak MDT model that may be employed by the disclosed system for space surveillance, in accordance with at least one embodiment of the present disclosure. In this figure, the formula 1510 for the pixel electron count (d), and the formula 1520 for the probability of detecting a target within a single frame ($P_z$) are shown. In addition, the formula 1600 for the probability of detection of a target in a streak ($P_D$), and the formula 1610 for the probability of collection (defined as detecting the target in at least M of N image frames) ($P_c$).

FIG. 17A shows a diagram 1700 of an exemplary sensor 1710 that may be employed for the disclosed system of space surveillance, in accordance with at least one embodiment of the present disclosure. The sensor 1710 has a three-mirror astigmat, and an aperture area equivalent to a 23.4 cm diameter circle.

The sensor 1710 can process 5-of-8 streak constant false alarm rate (CFAR) FPMLD. The detection threshold is set to provide a $P_D$ equal to 95 percent, with streak lengths up to 2.5 pixels. The detection performance analysis was conducted with the model anchored to high-fidelity sensor simulations and detection algorithms (i.e. Space Shot).

FIG. 17B shows a side view 1720 of the exemplary sensor 1710 of FIG. 17A, in accordance with at least one embodiment of the present disclosure.

Figure 18:
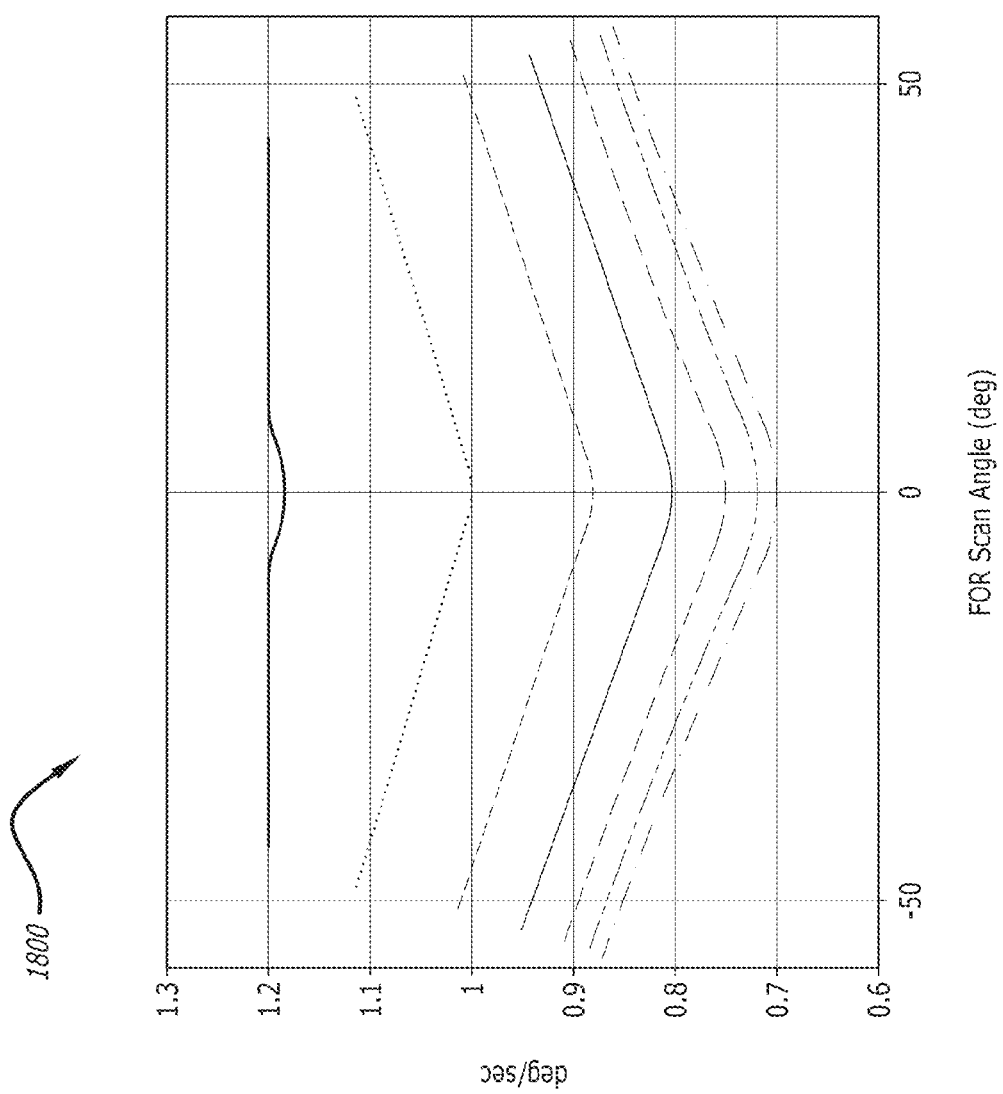
FIG. 18 is a graph depicting exemplary slew rate profiles for the disclosed system of space surveillance, in accordance with at least one embodiment of the present disclosure.

FIG. 18 is a graph 1800 depicting exemplary slew rate profiles for the disclosed system of space surveillance, in accordance with at least one embodiment of the present disclosure. In this figure, the x-axis of the graph 1800 represents the FOR scan angle in degrees (deg), and the y-axis of the graph 1800 represents degrees per second (deg/sec). In this graph 1800, each curve represents one of the sweeps of the raster scan (refer to raster scan 200 of FIG. 2).

FIG. 19A is a graph 1900 of the MDT size as a function of exposure time using the sensor 1710 of FIG. 17A for the disclosed system for space surveillance, in accordance with at least one embodiment of the present disclosure. In this figure, the x-axis of the graph 1900 represents the exposure time in seconds (sec), and the y-axis of the graph 1900 represents the MDT in centimeters (cm). As such, as shown in graph 1900, as the exposure time increases, the MDT size decreases.

FIG. 19B is a graph 1910 of the MDT absolute magnitude as a function of exposure time using the sensor 1710 of FIG. 17A for the disclosed system for space surveillance, in accordance with at least one embodiment of the present disclosure. In this figure, the x-axis of the graph 1910 represents the exposure time in seconds (sec), and the y-axis of the graph 1910 represents the MDT absolute magnitude (Mv). As such, as shown in graph 1910, as the exposure time increases, the MDT absolute magnitude increases.

FIG. 19C is a graph 1920 of scaled noise as a function of exposure time using the sensor 1710 of FIG. 17A for the disclosed system for space surveillance, in accordance with at least one embodiment of the present disclosure. In this figure, the x-axis of the graph 1920 represents the exposure time in seconds (sec), and the y-axis of the graph 1920 represents the scaled noise (pe-/exposure). As such, as shown in graph 1920, as the exposure time increases after about one (1) second has elapsed, the scaled noise increases.

FIGS. 20A-D are graphs showing exemplary scans for the disclosed system for space surveillance, in accordance with at least one embodiment of the present disclosure. In particular, these figures each show different views of an exemplary FOR scan geometry for a sensor 2000 on a satellite in super-GEO orbiting earth 2010. In these figures, the x-axis, y-axis, and z-axis each represent distance in million meters (Mm). Note that these diagrams depict surveillance of a particular surveillance sector defined as the volume of space within a sphere a few hundred km larger than GEO radius. The range to the far side of the sector (i.e. the range opposite the side of the sphere) varies as a function of pointing angle within the FOR.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with products in the form of computer program products embodied in a non-transitory computer readable medium such as a software product, embodiments may also involve products in the form of tangible goods or services that are consumed by individuals and corporate and government entities.

As a further example, embodiments may involve a sensor application that is a stand alone application, which may contain one or more programs, or that is part of another system or program.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for space surveillance, the method comprising:
   scanning, by at least one sensor on at least one satellite in inclined super-geostationary earth orbit (super-GEO), a raster scan over a field of regard (FOR),
   wherein the scanning is at a variable rate, which is dependent upon a target dwell time for detecting a target of interest,
   wherein the target dwell time is a function of a characteristic brightness of the target, and
   wherein the field of regard (FOR) of the at least one sensor is a function of a geometry between a sun and the at least one satellite and a function of an angle that the at least one satellite is pointing.

2. The method of claim 1, wherein an axis of inclination of the inclined super-GEO is chosen to minimize performance degradations due to earth exclusions.

3. The method of claim 1, wherein the target dwell time is further a function of a range from the at least one sensor to the target of interest and a function of a solar phase angle.

4. The method of claim 1, wherein the raster scan comprises at least one sweep.

5. The method of claim 4, wherein the at least one sweep is a continuous sweep.

6. The method of claim 1, wherein the method further comprises, during the scanning, collecting, by the at least one sensor, image frames over time.

7. The method of claim 6, wherein the image frames overlap.

8. The method of claim 1, wherein super-GEO is an orbit that has a radius that is larger than a geostationary earth orbit (GEO) radius for a majority of a duration of an orbital cycle.

9. The method of claim 1, wherein a time required for the raster scan is dependent upon an aperture diameter of the at least one sensor and the target dwell time.

10. The method of claim 9, wherein the time required for the raster scan is further dependent upon an altitude of the at least one sensor.

11. The method of claim 10, wherein the time required for the raster scan is further dependent upon an instantaneous field of view (IFOV) of the at least one sensor.

12. The method of claim 6, wherein the method further comprises comparing a detected brightness level in at least one of the image frames to a detection threshold.

13. The method of claim 12, wherein the method further comprises determining that the target of interest is present when the detected brightness level in at least one of the image frames exceeds the detection threshold.

14. The method of claim 12, wherein the method further comprises determining that the target of interest is not present when the detected brightness level in at least one of the image frames does not exceed the detection threshold.

15. The method of claim 1, wherein when there is two or more of the satellites, the method further comprises at least one of the satellites scanning at least a portion of a desired scan area where at least one of the sensors of at least one of the other satellites has low performance.

16. A system for space surveillance, the system comprising:
- at least one satellite in inclined super-geostationary earth orbit (super-GEO); and
- at least one sensor, on the at least one satellite, to scan a raster scan over a field of regard (FOR),
- wherein the scanning is at a variable rate, which is dependent upon a target dwell time for detecting a target of interest,
- wherein the target dwell time is a function of a characteristic brightness of the target, and
- wherein the field of regard (FOR) of the at least one sensor is a function of a geometry between a sun and the at least one satellite and a function of an angle that the at least one satellite is pointing.

17. The system of claim 16, wherein an axis of inclination of the inclined super-GEO is chosen to minimize performance degradations due to earth exclusions.

18. The system of claim 16, wherein the target dwell time is further a function of a range from the at least one sensor to the target of interest and a function of a solar phase angle.

19. The system of claim 16, wherein the raster scan comprises at least one sweep.

\* \* \* \* \*